United States Patent
Hatanaka et al.

(10) Patent No.: US 8,220,343 B2
(45) Date of Patent: Jul. 17, 2012

(54) FORCE SENSING DEVICE

(75) Inventors: Shinji Hatanaka, Okazaki (JP);
Shigeaki Nishihashi, Nagoya (JP);
Nozomi Kitagawa, Okazaki (JP)

(73) Assignees: Nippon Soken, Inc., Nishio (JP);
DENSO CORPORATION, Kariya (JP)

( * ) Notice: Subject to any disclaimer, the term of this patent is extended or adjusted under 35 U.S.C. 154(b) by 291 days.

(21) Appl. No.: 12/654,893

(22) Filed: Jan. 7, 2010

(65) Prior Publication Data
US 2010/0170349 A1     Jul. 8, 2010

(30) Foreign Application Priority Data

Jan. 8, 2009 (JP) .................................. 2009-2841
Dec. 9, 2009 (JP) ............................... 2009-279772

(51) Int. Cl.
*G01L 1/22* (2006.01)
*G01L 1/04* (2006.01)

(52) U.S. Cl. ......... 73/862.637; 73/862.044; 73/862.627; 73/862.629; 73/862.632; 73/862.636

(58) Field of Classification Search ............. 73/862.041–862.046, 504.04, 73/504.11–504.12, 767, 777, 862.622, 862.624, 73/862.626, 862.636, 862.68; 257/415, 730, 257/778, 417, 419; 345/161; 700/255
See application file for complete search history.

(56) References Cited

U.S. PATENT DOCUMENTS

| | | | | |
|---|---|---|---|---|
| 3,693,425 A | | 9/1972 | Starita et al. | |
| 4,454,771 A | * | 6/1984 | Shimazoe et al. | 73/862.68 |
| 4,573,362 A | * | 3/1986 | Amlani | 73/862.045 |
| 4,680,606 A | * | 7/1987 | Knutti et al. | 257/419 |
| 4,762,006 A | * | 8/1988 | Asakawa et al. | 73/862.044 |
| 4,862,751 A | * | 9/1989 | Asakawa et al. | 73/862.044 |
| 5,092,645 A | | 3/1992 | Okada | |
| 5,263,375 A | | 11/1993 | Okada | |
| 5,526,700 A | * | 6/1996 | Akeel | 73/862.043 |
| 5,714,694 A | * | 2/1998 | Diessner | 73/862.632 |

(Continued)

FOREIGN PATENT DOCUMENTS

EP     0 852 332     7/1998

(Continued)

OTHER PUBLICATIONS

Office Action mailed Mar. 15, 2011 in a corresponding Japanese Application No. 2009-279772 (English translation enclosed).

(Continued)

*Primary Examiner* — Lisa Caputo
*Assistant Examiner* — Jonathan Dunlap
(74) *Attorney, Agent, or Firm* — Posz Law Group, PLC

(57) ABSTRACT

The force sensing device includes a deformable member having portions arranged to make a pair with respect to the Z-axis. Three sets of strain detecting elements are formed on the deformable member for detecting deformations of the deformable member caused by a linear force in the X-axis, a linear force in the Y-axis and a rotational force about the Z-axis. The force sensing device includes a connecting member which connects between the pair of portions of the deformable member, and between the deformable member and a shaft of a manipulatable member. The force sensing device can be manufactured with easy wiring work and can detect the applied force in three degrees of freedom, including the linear force in the X-axis, the linear force in the Y-axis and the rotational force about the Z-axis.

4 Claims, 20 Drawing Sheets

U.S. PATENT DOCUMENTS

| | | | |
|---|---|---|---|
| 6,002,388 A * | 12/1999 | Seffernick et al. | 345/161 |
| 6,098,461 A * | 8/2000 | Okada | 73/514.34 |
| 6,121,954 A * | 9/2000 | Seffernick | 345/161 |
| 6,323,840 B1 * | 11/2001 | Steinbrunner | 345/161 |
| 6,331,849 B1 * | 12/2001 | VandenBoom | 345/161 |
| 6,530,283 B2 * | 3/2003 | Okada et al. | 73/780 |
| 6,642,857 B1 * | 11/2003 | Schediwy et al. | 341/20 |
| 6,859,048 B2 * | 2/2005 | Okada et al. | 324/681 |
| 6,915,709 B2 * | 7/2005 | Okada | 73/862.041 |
| 6,951,142 B2 * | 10/2005 | Ohsato et al. | 73/862.041 |
| 6,990,867 B2 * | 1/2006 | Okada | 73/780 |
| 7,075,527 B2 * | 7/2006 | Takagi et al. | 345/184 |
| 7,121,147 B2 * | 10/2006 | Okada | 73/760 |
| 7,123,028 B2 * | 10/2006 | Okada et al. | 324/681 |
| 7,219,561 B2 * | 5/2007 | Okada | 73/862.043 |
| 7,476,952 B2 * | 1/2009 | Vaganov et al. | 257/415 |
| 7,489,296 B2 * | 2/2009 | Nishino et al. | 345/157 |
| 7,536,923 B2 * | 5/2009 | Hirabayashi et al. | 73/862.044 |
| 7,554,167 B2 * | 6/2009 | Vaganov | 257/415 |
| 7,594,445 B2 * | 9/2009 | Hirabayashi et al. | 73/862.044 |
| 7,637,174 B2 * | 12/2009 | Hirabayashi | 73/862.041 |
| 7,757,571 B2 * | 7/2010 | Hirabayashi et al. | 73/862.626 |
| 7,772,657 B2 * | 8/2010 | Vaganov | 257/415 |
| 7,938,028 B2 * | 5/2011 | Hirabayashi et al. | 73/862.621 |
| 8,004,052 B2 * | 8/2011 | Vaganov | 257/415 |
| 8,053,267 B2 * | 11/2011 | Vaganov | 438/53 |
| 2002/0097224 A1 * | 7/2002 | Nishino et al. | 345/161 |
| 2005/0088411 A1 * | 4/2005 | Nishino et al. | 345/161 |
| 2005/0093822 A1 * | 5/2005 | Nishino et al. | 345/161 |
| 2005/0099391 A1 * | 5/2005 | Nishino et al. | 345/161 |

FOREIGN PATENT DOCUMENTS

| | | |
|---|---|---|
| JP | U-S56-83839 | 7/1981 |
| JP | A-H09-128142 | 5/1997 |
| JP | A-2001-330522 | 11/2001 |
| JP | A-2003-296017 | 10/2003 |
| JP | A-2004-127151 | 4/2004 |
| WO | WO-03/074986 | 9/2003 |

OTHER PUBLICATIONS

Office Action mailed Dec. 13, 2011 in corresponding JP Application No. 2009-279772 (and English Translation).

* cited by examiner

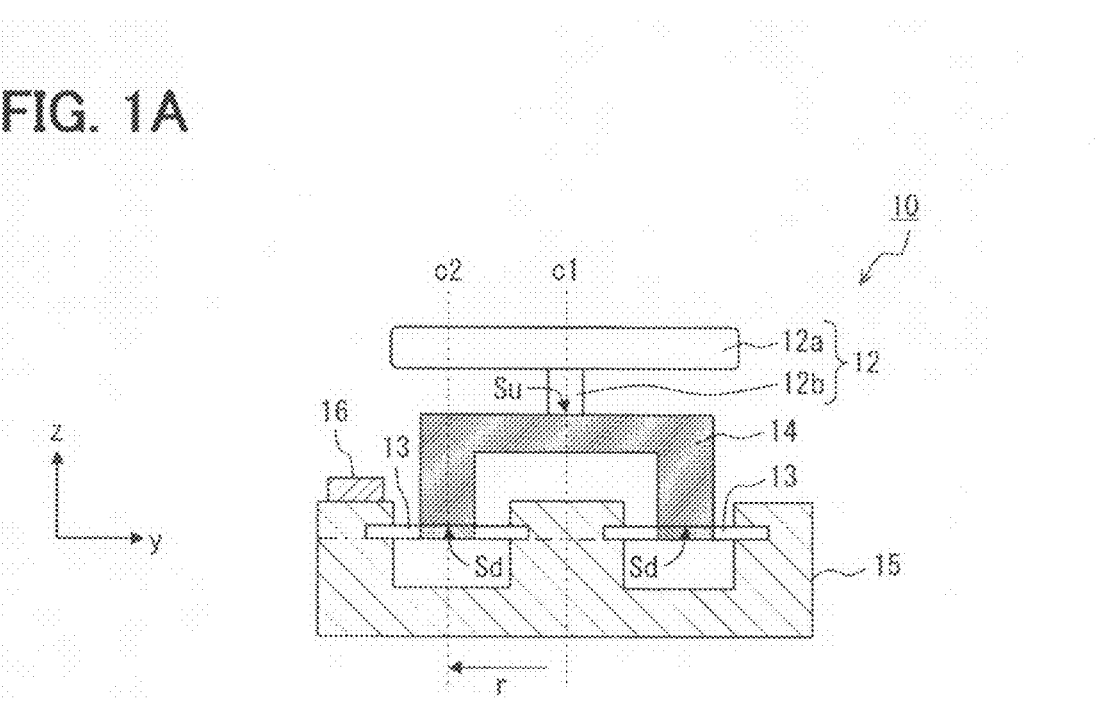

FIG. 3
|  | 171a~173a | 171b~173b | 171c~173c | 171d~173d |
|---|---|---|---|---|
| Fx(+) | + | − | + | − |
| Fx(−) | − | + | − | + |
| Fy(+) | + | + | − | − |
| Fy(−) | − | − | + | + |
| Mz(Clockwise) | + | − | − | + |
| Mz (Counterclockwise) | − | + | + | − |
FIG. 4A
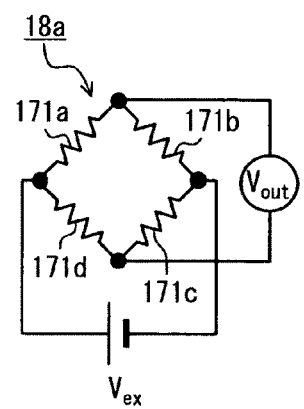
FIG. 4B
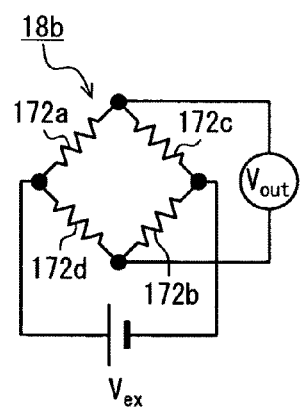
FIG. 4C
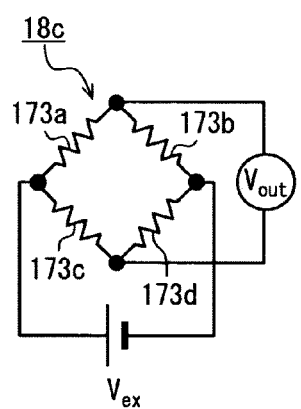

FIG. 15Aa  FIG. 15Ab  FIG. 15Ac
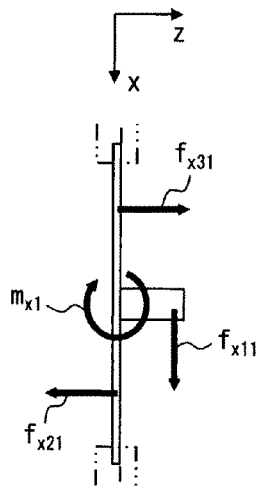 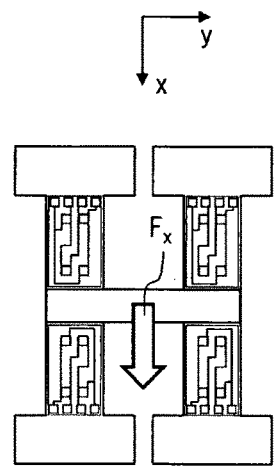 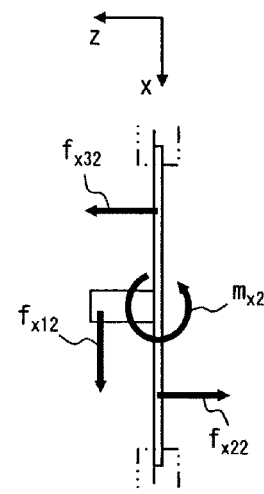
FIG. 15Ba  FIG. 15Bb  FIG. 15Bc
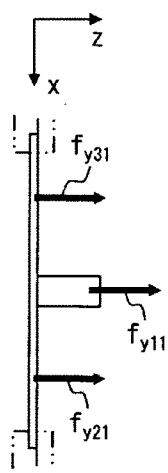 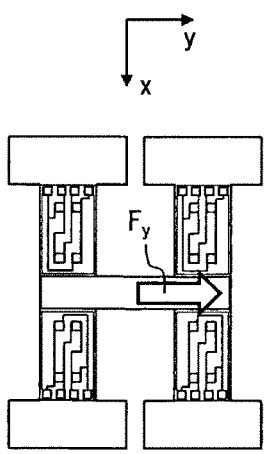 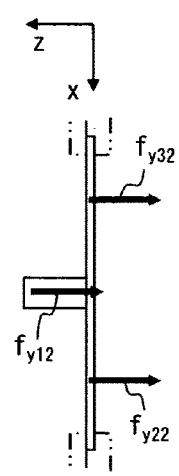

FIG. 17A
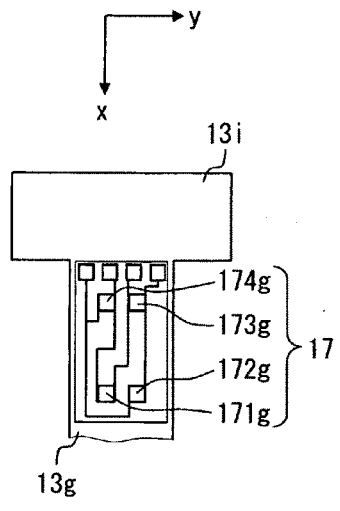
FIG. 17B
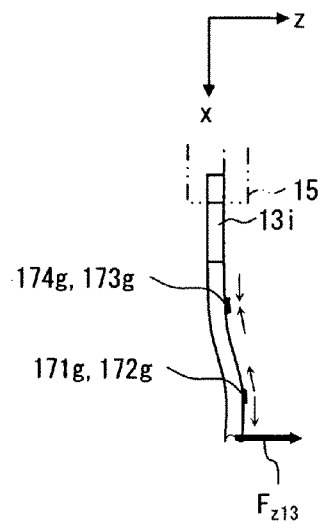
FIG. 18A
| ELEMENT | R |
|---|---|
| 171g | Inc. |
| 172g | Inc. |
| 173g | Dec. |
| 174g | Dec. |
FIG. 18B
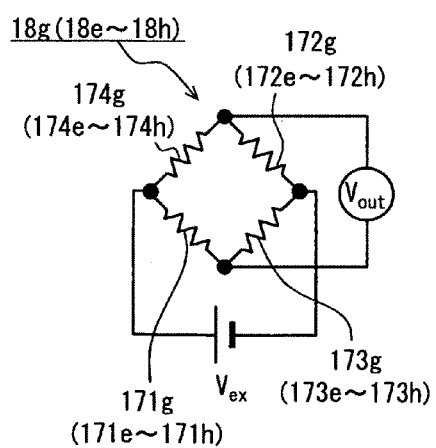

FIG. 19

|  | $V_{out}$ | | | |
| --- | --- | --- | --- | --- |
|  | 18e | 18f | 18g | 18h |
| Fx(+) | − | + | + | − |
| Fx(−) | + | − | − | + |
| Fy(+) | − | − | + | + |
| Fy(−) | + | + | − | − |
| Fz(+) | + | + | + | + |
| Fz(−) | − | − | − | − |
| Mz (Counterclockwise) | + | − | + | − |
| Mz (Clockwise) | − | + | − | + |

FORCE SENSING DEVICE

CROSS REFERENCE TO RELATED APPLICATION

This application is based on Japanese Patent Applications No. 2009-2841 filed on Jan. 8, 2009, and No. 2009-279772 filed on Dec. 9, 2009, the contents of which are incorporated herein by reference in its entirety.

FIELD OF THE INVENTION

The present invention relates to a force sensing device which may be applied to a pointing device for inputting analog signal to a computer system. The present invention may be applied to a pointing device which inputs analog operating signal for moving a movable cursor on a display screen of a vehicle navigation apparatus.

BACKGROUND OF THE INVENTION

Conventionally, technologies disclosed in the patent documents 1 and 2 are known as a force sensing device.
Patent document 1: JP-H09-128142A
Patent document 2: JP-H10-197373A In the technology disclosed in the patent document 1, a first strain detecting plate and a second strain detecting plate both of which have elasticity are combined in a cross shape in a plan view. The combined first and second strain detecting plates are disposed on a base plate so as to be placed vertical to the surface of the base plate. Strain gages are arranged on the surfaces of the first and second strain detecting plates. The strain gages have strain sensitive axis corresponding to directions perpendicular to longitudinal directions of the strain detecting plates.

In the technology disclosed in the patent document 2, the device includes an elastic plate which has elasticity, a manipulatable member and a set of four strain detecting elements, i.e., strain gages. The manipulatable member is disposed on the center of the elastic plate. At least a lower part of the manipulatable member is made of an elastic metallic wire. The strain detecting elements detects deformations of the elastic plate.

In the technology disclosed in the above-mentioned patent document 1, the surface of the base plate provides an X-Y plane and a direction vertical to the base plate provides a Z-axis. Since the first and second strain detecting plates have elasticity, the first and second strain detecting plates are distorted according to not only an applied force along an X-axis and a Y-axis, but also an applied force caused by a rotating moment about the Z-axis. Therefore, according to the technology disclosed in the above-mentioned patent document 1, it is possible to detect the applied forces of three degrees of freedom which includes force acting along the X-axis, force acting along the Y-axis, and force acting about the Z axis caused by a rotating moment. However, the technology in the patent document 1 requires employing a plurality of surfaces in order to support the strain gages, i.e., both surfaces on the first and second strain detecting plates are used for supporting the strain gages. Therefore, it is required to take complicated wiring steps, i.e., a soldering step, for leading out wirings from the strain gages. This may cause increase of cost.

On the other hand, in the technology disclosed in the patent document 1, since all of four strain detecting elements are disposed on the same surface of the elastic plate, wiring can be easily taken out from the strain detecting elements. In the technology disclosed in the patent document 2, the surface of the elastic plate provides an X-Y plane and a direction vertical to the elastic plate provides a Z-axis. Since elastic member is a flat plate with a rectangular shape in a plan view, even if a rotating moment about the Z-axis is applied, an amount of displacement of the elastic plate caused by the rotating moment is extremely small. Therefore, it is difficult to detect distortion of the elastic plate which originates in the rotating moment about the Z-axis. Therefore, the device can detect only the applied forces of two degrees of freedom which includes the force acting on the Y-axis direction and the force acting on the X-axis direction.

SUMMARY OF THE INVENTION

It is an object of the present invention to provide an improved force sensing device.

It is still another object of the present invention to provide a force sensing device which is capable of detecting manipulations in an X-axis, in a-Y axis, and a rotating manipulation about a Z-axis by using strain detecting plate(s) arranged on one plane. It is another object of the present invention to provide a force sensing device which is capable of wiring easily and detecting the applied forces of three degrees of freedom.

In one aspect of the invention, a force sensing device is provided. The force sensing device senses a force applied on a manipulatable member having a shaft. The device comprised a deformable member capable of deforming elastically and formed in a plate shape, a connecting member which connects the deformable member and the shaft of the manipulatable member, and at least four strain detecting elements which detect the deformation of the deformable member and outputs detection signals indicative of the applied force applied to the manipulatable member. In addition, all the strain detecting elements are arranged on one plane.

In such a configuration, if a rotational moment about the shaft of the manipulatable member is applied, the rotational moment is transformed into force acting on element disposed surfaces on the deformable member. The deformable member is elastically deformed according to the force. The strain detecting elements output detection signals indicative of amount of deformations. Forces in the X-axis and the Y-axis are detectable by using the deformable member 13 that only has two-dimensional detecting surface. In addition, the moment Mz about the Z-axis is also detectable. Therefore, it is possible to detect the applied force of three degrees of freedom.

In addition, it is possible to perform wiring work relating to the strain detecting elements easily. Therefore, it is possible to manufacture the force sensing device 10 in low cost. In one aspect of the invention, a force sensing device includes a deformable member which provides at least two portions which are arranged to make a pair with respect to the Z-axis. The device includes a connecting member which connects between the two portions so that the two portions are deformed differentially in response to the applied force in a rotational direction about the Z-axis. In one aspect of the invention, the force sensing device includes a deformable member which is formed to have a plurality of cantilever beams or a plurality of cross beams. The beams are arranged to be deformed in a plurality of combinations of deformation modes. The combinations of deformation modes are different from each other according to force in the three degrees of freedom which include a linear force acting along the X-axis, a linear force acting along the Y-axis, and a rotating force acting about the Z-axis.

BRIEF DESCRIPTION OF THE DRAWINGS

Additional objects and advantages of the present invention will be more readily apparent from the following detailed description of preferred embodiments when taken together with the accompanying drawings. In which:

FIG. 1A is a sectional view of a force sensing device according to a first embodiment of the present invention, and shows a cross section I-A in FIG. 1B;

FIG. 1B is a plan view of the force sensing device according to the first embodiment of the present invention;

FIG. 2Aa is a sectional view of a left side part when the force Fx is applied;

FIG. 2Ab is a plan view when the force Fx is applied;

FIG. 2Ac is a sectional view of a right side part when the force Fx is applied;

FIG. 2Bb is a plan view when the force Fy is applied;

FIG. 2Bc is a sectional view of a right side part when the force Fy is applied;

FIG. 2Cb is a plan view when the moment Mz is applied;

FIG. 2Cc is a sectional view of a right side part when the moment Mz is applied;

FIG. 3 is a drawing which shows a table of resistance changes of the strain detecting elements of the force sensing device according to the first embodiment of the present invention;

FIG. 4A is a circuit diagram showing a bridge circuit for detecting the applied force Fx on the force sensing device according to the first embodiment of the present invention;

FIG. 4B is a circuit diagram showing a bridge circuit for detecting the applied force Fy on the force sensing device according to the first embodiment of the present invention;

FIG. 4C is a circuit diagram showing a bridge circuit for detecting the moment Mz on the force sensing device according to the first embodiment of the present invention;

FIG. 7Aa is a sectional view of a left side part when the moment Mz is applied;

FIG. 7Ab is a plan view when the moment Mz is applied;

FIG. 7Ac is a sectional view of a right side part when the moment Mz is applied;

FIG. 7Ba is a sectional view of a left side part when the moment Mz is applied;

FIG. 7Bb is a plan view when the moment Mz is applied;

FIG. 7Bc is a sectional view of a right side part when the moment Mz is applied;

FIG. 10A is a plan view when the moment Mz is applied;

FIG. 10B is a sectional view showing a cross section X-B in FIG. 10A when the moment Mz is applied;

FIGS. 15Aa, 15Ab, and 15Ac, FIGS. 15Ba, 15Bb, and 15Bc, FIGS. 16Ca, 16Cb, and 16Cc, and FIGS. 16Da, 16Db, and 16Dc are drawings showing force components and moment components on each portions of the force sensing device according to the sixth embodiment of the present invention;

FIG. 15Aa is a sectional view of a left side part when the force Fx is applied;

FIG. 15Ab is a plan view when the force Fx is applied;

FIG. 15Ac is a sectional view of a right side part when the force Fx is applied;

FIG. 15Ba is a sectional view of a left side part when the force Fy is applied;

FIG. 15Bb is a plan view when the force Fy is applied;

FIG. 15Bc is a sectional view of a right side part when the force Fy is applied;

FIG. 16Cb is a plan view when the force Fz is applied;

FIG. 16Cc is a sectional view of a right side part when the force Fz is applied;

FIG. 16Db is a plan view when the moment Mz is applied;

FIG. 16Dc is a sectional view of a right side part when the moment Mz is applied;

FIG. 17A is a plan view of a part of the force sensing device according to the sixth embodiment of the present invention;

FIG. 17B is a side view of a part of the force sensing device according to the sixth embodiment of the present invention, and shows compression force direction and tension force direction by arrow symbols when the force Fz is applied;

FIG. 18A is a drawing which shows a table of resistance changes of the strain detecting elements of the force sensing device according to the sixth embodiment of the present invention;

FIG. 18B is a circuit diagram showing a bridge circuit for detecting the applied force on the force sensing device according to the sixth embodiment of the present invention;

FIG. 19 is a drawing which shows a table of combinations of output voltage polarities from bridge circuits with respect to each applied forces according to the sixth embodiment of the present invention;

DETAILED DESCRIPTION OF THE PREFERRED EMBODIMENTS

First Embodiment

Figure 2A:
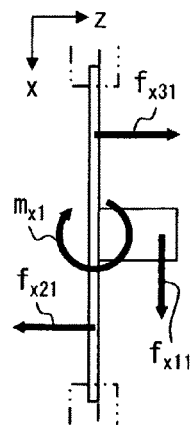
FIGS. 2Aa, 2Ab, and 2Ac, FIGS. 2Ba, 2Bb, and 2Bc, and FIGS. 2Ca, 2Cb, and 2Cc are drawings showing force components and moment components on each portions of the force sensing device according to the first embodiment of the present invention.
Figure 2A:
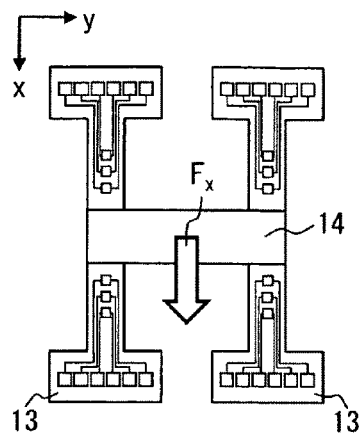
Figure 2A:
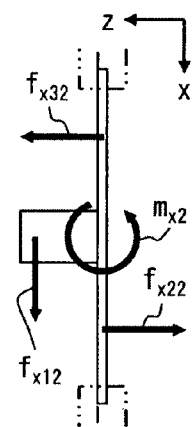

Hereinafter, a first embodiment of the force sensing device according to the present invention is explained, referring to FIGS. 1A-4C. First, the configuration of the force sensing device 10 is explained with reference to FIG. 1A and FIG. 1B. FIG. 1A is a cross sectional view of the force sensing device. FIG. 1A shows a I-A cross section in FIG. 1B. FIG. 1B is a plan view of the force sensing device.

As shown in FIG. 1A, the force sensing device 10 is provided with components, such as a manipulatable member 12, a deformable member 13, a connecting member 14, a housing 15, and a signal processing part 16.

Among these components, the manipulatable member 12 is provided with a grip portion 12a and a shaft 12b. The grip portion 12a on the manipulatable member 12 is formed in a circular shape in a plan view with a proper material. The grip portion 12a is formed to be directly manipulated by a user. The shaft 12b on the manipulatable member 12 is formed in a columnar shape and is integrally formed with the grip portion 12a. The shaft 12b is placed to be extended from the center of the grip portion 12a and to be extended vertically to the surface of the grip portion 12a. The shaft 12b is firmly connected with the connecting member 13. The connecting member 13 is firmly connected with the deformable member 13. In other words, the connecting member 13 connects between the shaft 12b and the deformable member 13 so that manipulating force applied to the manipulatable member 12 is transmitted to the deformable member 13 via the shaft 12b and the connecting member 14.

As shown in FIG. 1B, the deformable member 13 is provided with two plates which are formed in an I-shape in a plan view respectively and are arranged on the same plane so that both surfaces of the plates are placed to form a single plane. The I-shaped plates are fixed on the housing 15 at the end parts of the I-shaped plates respectively. Therefore, the I-shaped plates provide two cross beams disposed on the housing 15. The cross beams are symmetrically arranged on both sides with respect to the shaft 12b in the plan view. The connecting member 14 firmly connects between center portions of the cross beams. Therefore, the cross beams provide four cantilever beams symmetrically arranged with respect to the connecting member 14. The deformable member 13 is elastically deformed according to the applied force that is applied on the manipulatable member 12. The deformable member 13 is elastically deformed mainly in directions perpendicular to the surface of the deformable member 13, which is a Z-axis explained below. Electronic components including sensing elements and accompanying circuit components are formed on the surface of the deformable member. Although the electric components may be formed on both side surfaces of the deformable member 13, in this embodiment, the electric components all are formed on one surface of the deformable member 13 in order to allow a wiring work only from one surface side. A plurality of strain detecting elements 17, a plurality of wiring patterns and a plurality of electrodes are formed on the surface of the deformable member 13. The strain detecting elements 17 includes three sets of strain detecting elements 171a-171d, 172a-172d and 173a-173d. The strain detecting elements detect deformation of the deformable member 13. The wiring patterns and electrodes are used to assembly bridge circuits of the strain detecting elements 17. The surface that carries the strain detecting elements, which is the upper surface in this embodiment, of the deformable member 13 may be referred to as the element disposed surface.

It is assumed that the surface of the deformable member 13 defines an X-Y plane that is defined by an X-axis and a Y-axis perpendicularly crossing each other. It is assumed that the positive direction of the X-axis is a downward direction in FIG. 1B. It is assumed that the positive direction of the Y-axis is a rightward direction in FIG. 1B. It is assumed that a direction perpendicular to the surface of the deformable member 13 is a Z-axis perpendicular to both the X-axis and the Y-axis. The positive direction may be also referred to as a plus direction. The negative direction may be also referred to as a minus direction. The strain detecting elements 17 detects deformation of the deformable member 13 caused by the applied force applied on the manipulatable member 12. Each components of the applied force in each axis is detected by each set of the strain detecting elements 17. The strain detecting elements 171a-171d detects deformation of the deformable member 13 caused by the applied force acting along the X-axis. The strain detecting elements 172a-172d detects deformation of the deformable member 13 caused by the applied force acting along the Y-axis. The strain detecting elements 173a-173d detects deformation of the deformable member 13 caused by the applied force that is a rotational moment about the Z-axis.

The strain detecting elements 17, i.e., 171a-173d, may be provided by known elements. This embodiment employs four strain detecting elements for detecting each applied force of three degrees of freedom, such as the applied force acting along the X-axis, the applied force acting along the Y-axis, and the applied force acting rotationally about the Z-axis. Therefore, twelve elements in total are used. However, the applied force of three degrees of freedom can be detected by using several alternative arrangements of the strain detecting elements. For example, at least a total of four strain detecting elements may be sufficient for detecting the applied force of three degrees of freedom.

The connecting member 14 is made of metallic materials, such as iron, aluminum, and stainless steel. The connecting member 14 is formed in a rectangular shape in the plan view and in a bracket shape in a side view. The connecting member 14 has a connected area Su that is located on a substantial center in a longitudinal direction on the upper surface and is firmly connected with the shaft 12b of the manipulatable member 12. The connecting member 14 has connected areas Sd that are located on both ends on the bottom surface and are firmly connected with corresponding part of the deformable member 13. Each one of the connected areas Sd of the connecting member 14 faces a substantial center in a longitudinal direction on the deformable member 13. The deformable member 13 and the connecting member 14 are arranged so that distances "r" from an axial center C1 of the shaft 12b of the manipulatable member 12 to a centerline C2 of the connected areas Sd are longer than the radius of the shaft 12b of the manipulatable member 12. The centerline C2 is a line that passes the center of the connected area Sd and is vertical to the connected area Sd. The connecting member 14 firmly connects between the shaft 12b of the manipulatable members 12 and the surface of the deformable member 13 so that the shaft 12b of the manipulatable member 12 is placed to define a right angle with respect to the surface of the deformable member 13.

The housing 15 is made of a proper material. The housing 15 directly supports the deformable member 13. As a result, the housing 15 supports the other components, such as the connecting member 14 connected with the deformable member 13, and the manipulatable member 12 connected with the connecting member 14. The housing 15 is formed with recesses corresponding to portions where the deformable member 13 is disposed as the crossbeams. In other words, the recesses are formed in portions where the strain detecting elements 17 are located on the deformable members 13. The recesses enable the deformable member 13 to be elastically deformed in the direction vertical to the surface thereof. The elastic deformation is not prevented by the housing 14.

The signal processing part 16 has a plurality of bridge circuits 18a-18c. The bridge circuits 18a-18c are assembled by combining the strain detecting elements 171a-173d. The signal processing part 16 detects the applied force applied on the manipulatable member 12 based on the detecting signals from the bridge circuits 18a-18c.

Figure 2B:
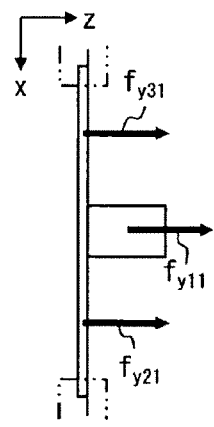
FIG. 2Ba is a sectional view of a left side part when the force Fy is applied.
Figure 2B:
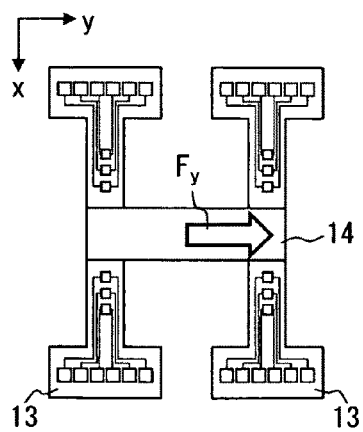
Figure 2B:
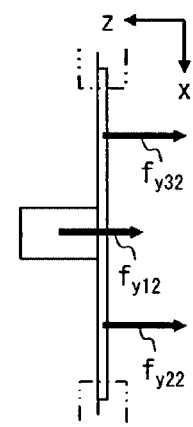
Figure 2C:
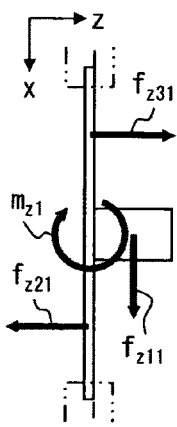
FIG. 2Ca is a sectional view of a left side part when the moment Mz is applied.
Figure 2C:
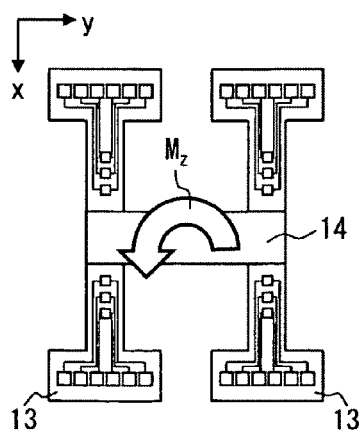
Figure 2C:
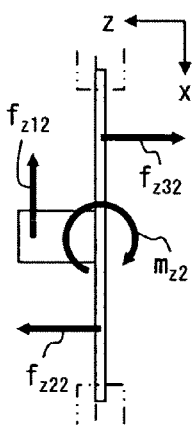

Operation of the force sensing device 10 is explained referring to FIGS. 2Aa-2Cc. FIGS. 2Aa, 2Ab, and 2Ac show the case where the applied force in the plus direction in the X-axis is applied to the manipulatable member 12. The force in the plus direction in the X-axis may be also referred to as the force Fx(+). The force in the minus direction in the X-axis may be also referred to as the force Fx(−). FIGS. 2Ba, 2Bb, and 2Bc show the case where the applied force in the plus direction in the Y-axis is applied to the manipulatable member 12. The force in the plus direction in the Y-axis may be also referred to as the force Fy(+). The force in the minus direction in the Y-axis may be also referred to as the force Fy(−). FIGS. 2Ca, 2Cb, and 2Cc show the case where the rotational moment about the Z-axis in a counterclockwise direction is applied to the manipulatable member 12. The rotational moment, i.e., rotational force, in the counterclockwise direction about the Z-axis may be also referred to as the moment Mz(counterclockwise). The moment in the clockwise direction about the Z-axis may be also referred to as the moment Mz(clockwise).

<In Case of Applied Force Fx(+)>

Suppose that a user applies a linear applied force Fx(+) to the manipulatable member 12. At this time, the applied force Fx(+) is transmitted to the connecting member 14 through the shaft 12b, and acts on the connecting member 14 as shown in FIG. 2Ab.

If the applied force Fx(+) acts on the connecting member 14, as shown in FIG. 2Aa, a force fx11 acts on a left side part of the connecting member 14 in the plus direction of the X-axis. Simultaneously, as shown in FIG. 2Ac, a force fx12 acts on a right side part of the connecting member 14 in the plus direction of the X-axis.

The connecting member 14 is firmly connected with the deformable member 13. Therefore, if the force fx11 acts on the left side part of the connecting member 14, a force fx21 in the minus direction of the Z-axis acts on an element disposed area of the deformable member 13 illustrated below the left side part of the connecting member 14 in the drawing. Simultaneously, a force fx31 in the plus direction of the Z-axis acts on the element disposed area of the deformable member 13 illustrated above the left side part of the connecting member 14 in the drawing.

Similarly, if a force fx12 acts on the right side part of the connecting member 14, a force fx22 in the minus direction of the Z-axis acts on an element disposed area of the deformable member 13 illustrated below the right side part of the connecting member 14 in the drawing. Simultaneously, a force fx32 in the plus direction of the Z-axis acts on the element disposed area of the deformable member 13 illustrated above the right side part of the connecting member 14 in the drawing.

As mentioned above, the applied force Fx(+) is transformed into a pair of forces fx21 and fx31, and a pair of forces fx22 and fx32, all vertical to the surface of the deformable member 13. The forces act on the deformable member 13. The forces fx21 and fx31 acting thereon generate a moment mx1 rotational about a center of the connected area Sd located on the left side part of the connecting member 14. The forces fx22 and fx32 acting thereon generate a moment mx2 rotational about a center of the connected area Sd located on the right side part of the connecting member 14.

<In Case of Applied Force Fx(−)>

If a user applies a linear applied force Fx(−) to the manipulatable member 12, each parts acts oppositely and receives opposite force components with respect to the case illustrated in FIG. 2Aa, FIG. 2Ab, and FIG. 2Ac.

<In Case of Applied Force Fy(+)>

Suppose that a user applies a linear applied force Fy(+) to the manipulatable member 12. At this time, the applied force Fy(+) is transmitted to the connecting member 14 through the shaft 12b, and acts on the connecting member 14 as shown in FIG. 2Bb.

If the applied force Fy(+) acts on the connecting member 14, as shown in FIG. 2Ba, a force fy11 acts on the left side part of the connecting member 14 in the plus direction of the Z-axis. Simultaneously, as shown in FIG. 2Bc, a force fy12 acts on the right side part of the connecting member 14 in the minus direction of the Z-axis.

The connecting member 14 is firmly connected with the deformable member 13. Therefore, if the force fy11 acts on the left side part of the connecting member 14, a force fy21 in the plus direction of the Z-axis acts on the element disposed area of the deformable member 13 illustrated below the left side part of the connecting member 14 in the drawing. Simultaneously, a force fy31 in the plus direction of the Z-axis acts on the element disposed area of the deformable member 13 illustrated above the left side part of the connecting member 14 in the drawing.

Similarly, if a force fy12 acts on the right side part of the connecting member 14, a force fy22 in the minus direction of the Z-axis acts on the element disposed area of the deformable member 13 illustrated below the right side part of the connecting member 14 in the drawing. Simultaneously, a force fy32 in the minus direction of the Z-axis acts on the element disposed area of the deformable member 13 illustrated above the right side part of the connecting member 14 in the drawing.

As mentioned above, the applied force Fy(+) is transformed into a pair of forces fy21 and fy31, and a pair of forces fy22 and fy32, all vertical to the surface of the deformable member 13. The forces act on the deformable member 13.

<In Case of Applied Force Fy(−)>

If a user applies a linear applied force Fy(−) to the manipulatable member 12, each parts acts oppositely and receives opposite force components with respect to the case illustrated in FIG. 2Ba, FIG. 2Bb, and FIG. 2Bc.

<In Case of Applied Force Mz(Counterclockwise)>

Suppose that a user applies a rotational applied force Mz(counterclockwise), which is the moment Mz(counterclockwise), to the manipulatable member 12. At this time, the moment Mz(counterclockwise) is transmitted to the connecting member 14 through the shaft 12b, and acts on the connecting member 14 as shown in FIG. 2Cb.

If the moment Mz(counterclockwise) acts on the connecting member 14, as shown in FIG. 2Ca, a force fz11 acts on the left side part of the connecting member 14 in the plus direction of the X-axis. Simultaneously, as shown in FIG. 2Cc, a force fz12 acts on the right side part of the connecting member 14 in the minus direction of the X-axis.

The connecting member 14 is firmly connected with the deformable member 13. Therefore, if the force fz11 acts on the left side part of the connecting member 14, a force fz21 in the minus direction of the Z-axis acts on an element disposed area of the deformable member 13 illustrated below the left side part of the connecting member 14 in the drawing. Simultaneously, a force fz31 in the plus direction of the Z-axis acts on the element disposed area of the deformable member 13 illustrated above the left side part of the connecting member 14 in the drawing.

Similarly, if a force fz12 acts on the right side part of the connecting member 14, a force fz22 in the plus direction of the Z-axis acts on the element disposed area of the deformable member 13 illustrated below the right side part of the connecting member 14 in the drawing. Simultaneously, a force fz32 in the minus direction of the Z-axis acts on the element disposed area of the deformable member 13 illustrated above the right side part of the connecting member 14 in the drawing.

As mentioned above, the moment Mz(counterclockwise) is transformed into a pair of forces fz21 and fz31, and a pair of forces fz22 and fz32, all vertical to the surface of the deformable member 13. The forces act on the deformable member 13. The forces fz21 and fz31 acting thereon generate a moment mz1 rotational about a center of the connected area Sd located on the left side part of the connecting member 14. The forces fz22 and fz32 acting thereon generate a moment mz2 rotational about a center of the connected area Sd located on the right side part of the connecting member 14.

<In Case of Applied Force Mz(Clockwise)>

If a user applies a rotational applied force Mz(clockwise) to the manipulatable member 12, each parts acts oppositely and receives opposite force components with respect to the case illustrated in FIG. 2Ca, FIG. 2Cb, and FIG. 2Cc.

FIG. 3 shows a table showing changing directions of resistances of the strain detecting elements. The resistances of the strain detecting elements are varied according to the applied force including the linear and rotational forces applied on the manipulatable member 12. In the example shown in FIGS. 2Aa, 2Ab and 2Ac, the strain detecting elements 171a-173d show resistance changes as shown in the first line in FIG. 3. In the example shown in FIGS. 2Ba, 2Bb and 2Bc, the strain detecting elements 171a-173d show resistance changes as shown in the third line in FIG. 3. In the example shown in FIGS. 2Ca, 2Cb and 2Cc, the strain detecting elements 171a-173d show resistance changes as shown in the sixth line in FIG. 3.

Based on the characteristics of resistance change of the strain detecting elements 171a-173d, the bridge circuits are assembled as shown in FIG. 4A, FIG. 4B, and FIG. 4C. As shown in FIG. 4A, the bridge circuit 18a is assembled to be sensitive to the applied force Fx(+) and Fx(−) acting along the X-axis of the manipulatable member 12. As shown in FIG. 4B, the bridge circuit 18b is assembled to be sensitive to the applied force Fy(+) and Fy(−) acting along the Y-axis of the manipulatable member 12. As shown in FIG. 4C, the bridge circuit 18c is assembled to be sensitive to the applied force Mz(counterclockwise) and Mz(clockwise) acting rotationally about the Z-axis of the manipulatable member 12.

When the applied force Fx(+) is applied, the resistances of the strain detecting elements 171a and 171c are increased. On the other hand, the resistances of the strain detecting elements 171b and 171d are decreased. On the contrary, when the applied force Fx(−) is applied, the resistances of the strain detecting elements 171a and 171c are decreased. On the other hand, the resistances of the strain detecting elements 171b and 171d are increased. Therefore, as shown in FIG. 4A, the bridge circuit 18a is constructed so that the strain detecting elements 171a and 171c are arranged on orthogonally located arms respectively, and so that the strain detecting elements 171b and 171d are arranged on the other orthogonally located arms respectively.

Similarly, when the applied force Fy(+) is applied, the resistances of the strain detecting elements 172a and 172b are increased. On the other hand, the resistances of the strain detecting elements 172c and 172d are decreased. On the contrary, when the applied force Fy(−) is applied, the resistances of the strain detecting elements 172a and 172b are decreased. On the other hand, the resistances of the strain detecting elements 172c and 172d are increased. Therefore, as shown in FIG. 4B, the bridge circuit 18b is constructed so that the strain detecting elements 172a and 172b are arranged on orthogonally located arms respectively, and so that the strain detecting elements 172c and 172d are arranged on the other orthogonally located arms respectively.

Similarly, when the applied force Mz(clockwise) is applied, the resistances of the strain detecting elements 173a and 173d are increased. On the other hand, the resistances of the strain detecting elements 173b and 173c are decreased. On the contrary, when the applied force Mz(counterclockwise) is applied, the resistances of the strain detecting elements 173a and 173d are decreased. On the other hand, the resistances of the strain detecting elements 173b and 173c are increased. Therefore, as shown in FIG. 4C, the bridge circuit 18c is constructed so that the strain detecting elements 173a and 173d are arranged on orthogonally located arms respectively, and so that the strain detecting elements 173b and 173c are arranged on the other orthogonally located arms respectively.

The signal processing part 16 receives the output voltages Vout on each middle point of the bridge circuits 18a-18c, and detects the applied force of three degrees of freedom independently. The applied force of three degrees of freedom includes the linear applied force acting along the X-axis, the linear applied force acting along the Y-axis, and the rotational applied force about the Z-axis.

As explained above, the deformable member 13 which has two plates providing the element disposed surfaces which are placed on the same plane. In addition, the strain detecting elements 171a-173d are arranged on the element disposed surfaces placed on the same plane. The deformable member 13 provides two portions by independent two I-shaped plates. The one portion of the deformable member 13 and the other portion of the deformable member 13 can be displaced, i.e., deformed, independently with each other. These two portions on the deformable member 13 may be provided by independent flat plates or independent beams. Independent strain detecting elements are disposed on these two portions. The two portions are connected by the connecting member 14 in a bridging manner. As a result, it is possible to obtain the detection signals indicative of the applied force in the X-axis, the linear applied force in the Y-axis, and the rotational applied force about the Z-axis.

In one aspect of view, it is possible to describe that the deformable member 13 provides four rectangular portions. Two rectangular portions are provided by one I-shaped plate. Four rectangular portions are arranged around the shaft of the manipulatable member 12 on the X-Y plane in a distributed manner. Each rectangular portion is provided with at least one of strain detecting elements. Four rectangular portions are connected with each other via the connecting member 14. As a result, it is possible to obtain the detection signals indicative of the applied force in the X-axis, the linear applied force in the Y-axis, and the rotational applied force about the Z-axis.

In one aspect of view, the deformable member 13 provides two portions which are arranged to make a pair with respect to the Z-axis at least. These two portions are connected with each other via the connecting member 14. The connecting member 14 connects two portions so that the portions are deformed in a differential manner in response to the rotational applied force about the Z-axis. In other words, the connecting member 14 connects two portions so that the portions are deformed in opposite directions in response to the rotational applied force about the Z-axis. The deformable member 13 is formed to have a plurality of cantilever beams or a plurality of cross beams. The deformable member 13 illustrated may be considered to have two cross beams or to have four cantilever beams. The beams can be deformed in a plurality of combinations of deformation modes. The combinations of deformation modes are different from each other according to force in the three degrees of freedom. The force in the three degrees of freedom include a linear force acting along the X-axis, a linear force acting along the Y-axis, and a rotating force acting about the Z-axis. For example, a first combination of deformation modes is illustrated in FIGS. 2Aa, 2Ab, and 2Ac. A second combination of deformation modes is illustrated in FIGS. 2Ba, 2Bb, and 2Bc. A third combination of deformation modes is illustrated in FIGS. 2Ca, 2Cb, and 2Cc.

A plurality of sets of the strain detecting elements 17 are disposed on the deformable member 13. Each one of the sets of the strain detecting elements 17 is sensitive to and corresponds to each one of the combinations of deformation modes. For example, a first set of the strain detecting elements 171a-171d shown in FIG. 4A is responsive to the first combination of deformation modes, and outputs the detection signal according to an amount of deformation. A second set of the strain detecting elements 172a-172d shown in FIG. 4B is responsive to the second combination of deformation modes, and outputs the detection signal, according to an amount of deformation. A third set of the strain detecting elements 173a-173d shown in FIG. 4C is responsive to the third combination of deformation modes, and outputs the detection signal according to an amount of deformation. As a result, it is possible to obtain the detection signals indicative of the force acting along the X-axis on the plane, the force acting along the Y-axis on the plane, and the rotational force acting about the Z-axis, by using the deformable member 13 that is arranged on the plane.

In the technology disclosed in the patent document 1 explained in the background art, the strain gages must be manually arranged on a first strain detecting plate and a second strain detecting plate. Therefore, it is necessary to increase number of manufacturing steps and increase cost.

However, in the embodiment, it is easy to arrange the strain detecting elements 171a-173d to the element disposed surface of the deformable member 13 arranged on the same plane. For example, printing technique can be used to dispose the strain detecting elements 17. As a result, it is possible to decrease number of manufacturing steps substantially. In addition, since the strain detecting elements 171a-173d are arranged on the element disposed surface of the deformable member 13 arranged on the same plane, the strain detecting elements 171a-173d can be wired easily. Therefore, it is possible to manufacture the force sensing device 10 in low cost. There must be a tolerance, even if the deformable member 13 is manufactured so that the element disposed surfaces of the deformable member 13 are placed on the same plane. Even if such a tolerance exists, it is still easy to arrange the strain detecting elements 171a-173d to the element disposed surfaces of the deformable member 13.

In the embodiment, the connecting member 14 firmly connects between the connected area Sd and the shaft 12b of the manipulatable member 12. In such configuration, if the moment Mz about the Z-axis is applied, the moment Mz is amplified by the connecting member 14 and is transformed into the force acting on the surface of the deformable member 13, and is applied on the surface of the deformable member 13. Then, the deformable member 13 is elastically deformed according to the applied force. This deformation is detected by the strain detecting elements 171a-173d. Thus, it is possible to detect the moment Mz acting about the shaft 12b of the manipulatable member 12. Forces in the X-axis and the Y-axis are detectable by using the deformable member 13 that only has two-dimensional detecting surface. In addition, the moment Mz about the Z-axis is also detectable on the above embodiment. Therefore, it is possible to detect the applied force of three degrees of freedom.

Modification of First Embodiment

In the first embodiment, as shown in FIG. 1B, the deformable member 13 is provided with two plates having identical shape. However, the shape of the deformable member 13 is not limited to the above embodiment. For example, a deformable member may be provided with two plates having different shapes from each other. The device may be configured by arranging two differently shaped deformable members so that element disposed areas of the deformable members are placed on the same plane.

Figure 5A:
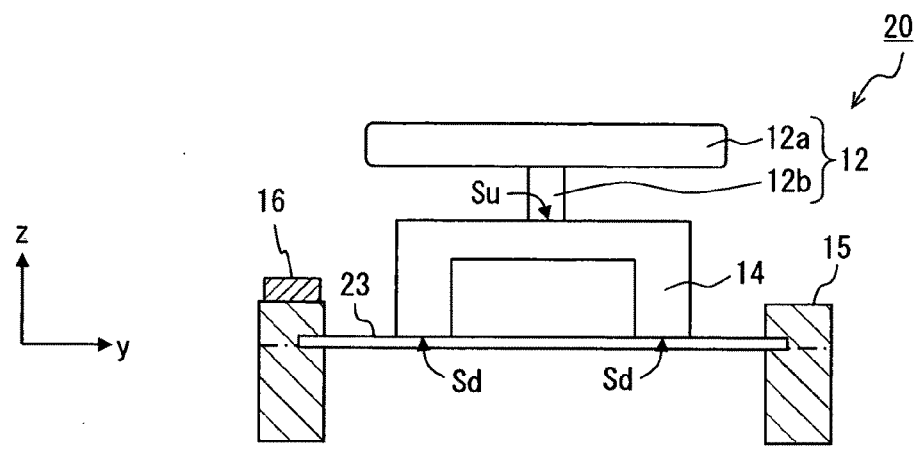
FIG. 5A is a sectional view of a force sensing device according to a modification of the first embodiment of the present invention, and shows a cross section V-A in FIG. 5B.
Figure 5B:
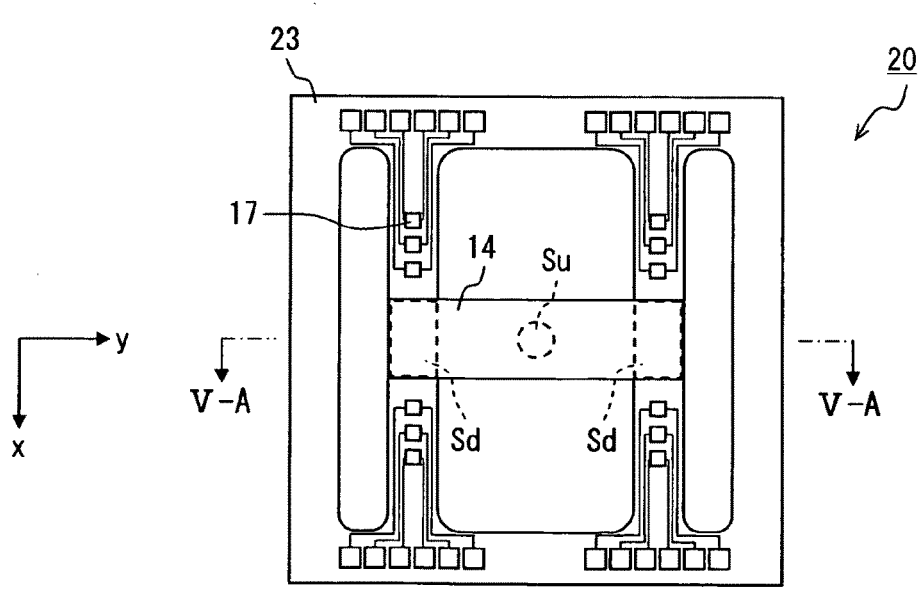
FIG. 5B is a plan view of the force sensing device according to the modification of the first embodiment of the present invention.

In the first embodiment, as shown in FIG. 1B, the deformable member 13 is provided with two plates having identical shape in order to improve manufacturing effectiveness. However, the shape of the deformable member is not limited to the above. As shown in FIG. 5A and FIG. 5B, a single plate may be used as a deformable member 23. The deformable member 23 is constructed as a single plate. The deformable member 23 includes two plate areas formed in I-shape in a plan view. In other words, the deformable member 23 has three slits to define two crossbeams symmetrically arranged on both sides of the shaft 12b. By providing the deformable member 23 in a single plate, it is possible to decrease number of parts and make assembly steps easy.

Second Embodiment

Figure 6A:
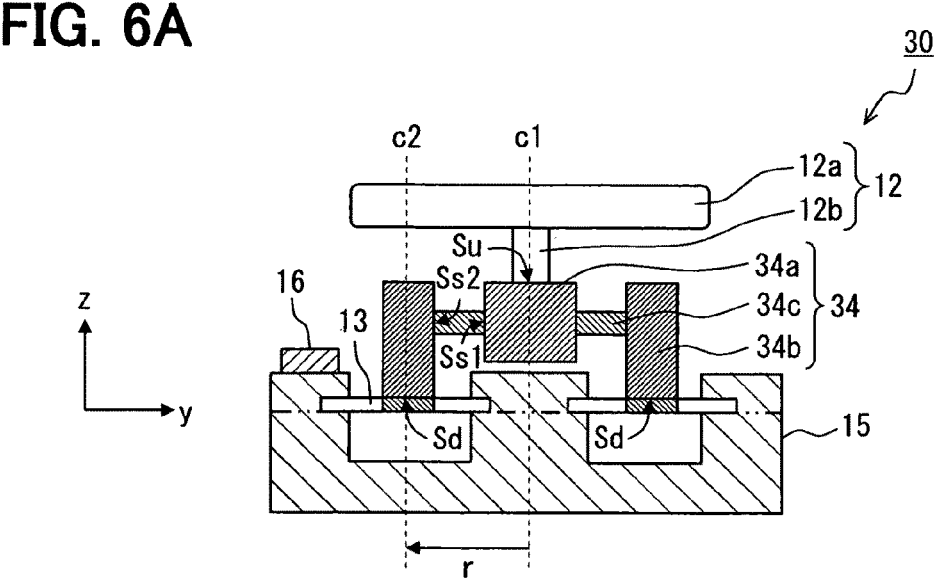
FIG. 6A is a sectional view of a force sensing device according to a second embodiment of the present invention, and shows a cross section VI-A in FIG. 6B.

Next, a second embodiment of the force sensing device according to the present invention is explained, referring to FIGS. 6A-7Bc. FIG. 6A and FIG. 6B are drawings corresponding to FIG. 1A and FIG. 1B respectively.

Figure 6B:
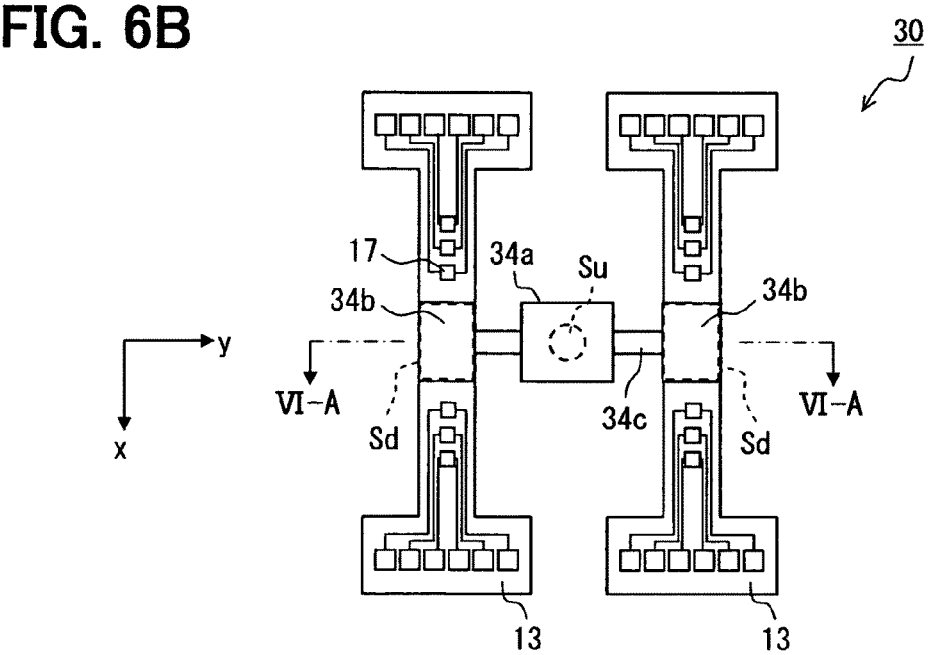
FIG. 6B is a plan view of the force sensing device according to the second embodiment of the present invention.

In the first embodiment, the connecting member 14 is formed by a single unitary member. However, in the second embodiment, as shown in FIG. 6A and FIG. 6B, a connecting member 34 is provided by combining a plurality of members. The remaining configuration of the second embodiment is the same as or similar to the configuration described in the first embodiment. Hereinafter, different portions from the first embodiment are mainly explained.

As shown in FIG. 6A, the connecting member 34 is constructed by combining a single piece of first portion 34a disposed on a manipulatable member side, two pieces of second portions 34b disposed on deformable member sides, and two pieces of joint portion 34c.

In detail, the first portion 34a is made of metallic materials, such as iron, aluminum, and stainless steel. The first portion 34a is formed in a square pillar shape. The first portion 34a has a connected area Su that is located on a substantial center in a longitudinal direction on the upper surface and is firmly connected with the shaft 12b of the manipulatable member 12.

Similarly, the second portions 34b are made of metallic materials, such as iron, aluminum, and stainless steel. Each of the second portions 34b is formed in a square pillar shape. The second portion 34b has a connected area Sd that is whole bottom surface thereof and is firmly connected with the surface, i.e., the element disposed surface, of the deformable member 13. Two connected areas Sd are firmly connected with two I-shaped crossbeams respectively. The connected area Sd of the second portion 34b faces substantial center in a longitudinal direction on the deformable member 13.

The joint portions 34c are made of metallic materials, such as iron, aluminum, and stainless steel. Each of the joint portions 34c is formed in a columnar shape. The joint portion 34c is formed narrower than the first portion 34a and the second portion 34b. The joint portion 34c is formed so that a cross-sectional area in a cross section vertical to an axis thereof is apparently smaller than that of the first portion 34a and the second portion 34b. The first portion 34a has connected areas Ss1 that are located on substantial center of side surfaces of the first portion 34a and are firmly connected with corresponding one of the joint portions 34c respectively. Each of the second portions 34b has a connected area Ss2 that is located slightly above with respect to a substantial center of a side surface of the second portion 34b and is firmly connected with corresponding one of the joint portions 34c. In other words, the joint portion 34c is connected to the second portion 34b so as to extend a vertical distance between the connected area Sd and the connected area Ss2 as much as possible.

When the applied force is applied to the grip portion 12a, since the joint portion 34c is formed narrower than the first portion 34a and the second portion 34b, the joint portion 34c is deformed, i.e., twisted, more greatly than the first portion 34a and the second portion 34b. The first portion 34a, the second portion 34b, and the joint portion 34c may be made of elastic materials other than the metallic material.

Figure 7A:
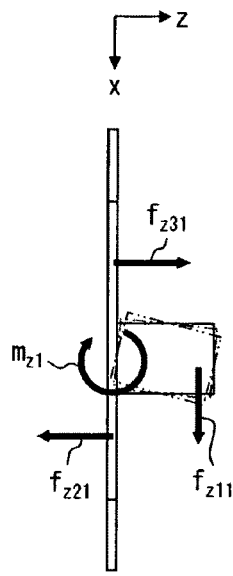
FIGS. 7Aa, 7Ab, and 7Ac are drawings showing force components and moment components on each portions of the force sensing device according to the first embodiment of the present invention.
Figure 7A:
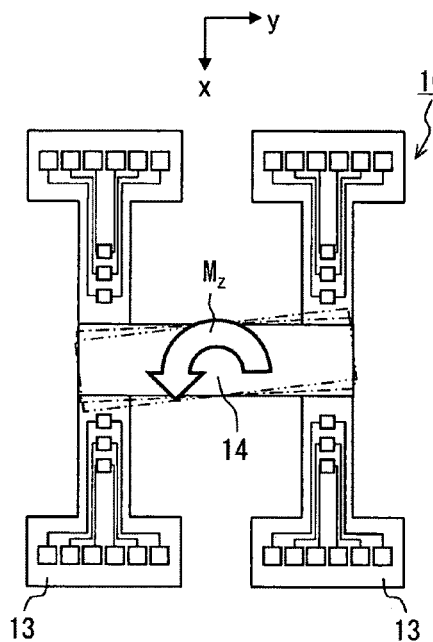
Figure 7A:
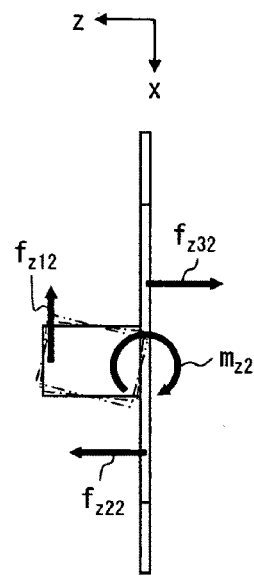
Figure 7B:
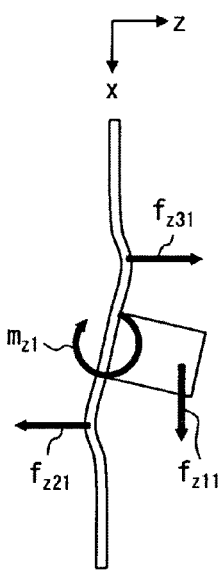
FIGS. 7Ba, 7Bb, and 7Bc are drawings showing force components and moment components on each portions of the force sensing device according to the second embodiment of the present invention.
Figure 7B:
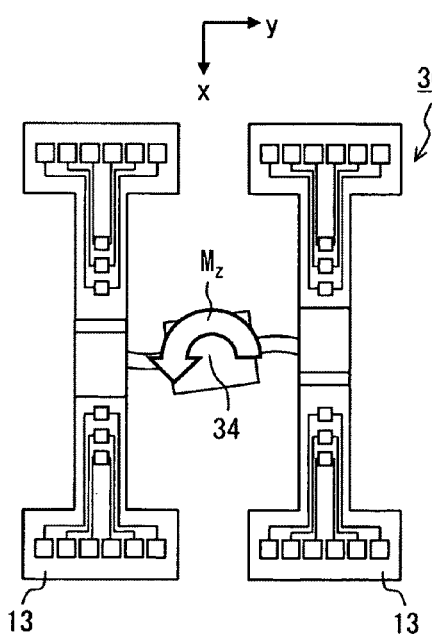
Figure 7B:
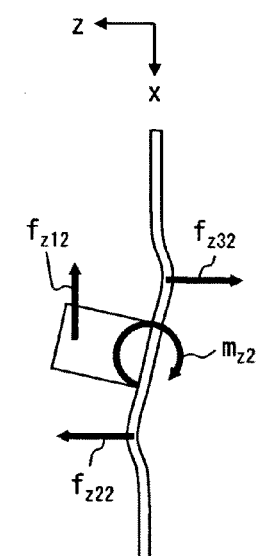

FIGS. 7Aa, 7Ab, and 7Ac are drawings showing force components and moment components on each portions of the deformable member 13, in a case that the rotational moment about the Z-axis is applied to the manipulatable member 12 in the first embodiment. FIGS. 7Ba, 7Bb, and 7Bc are drawings showing force components and moment components on each portions of the deformable member 13, in a case that the rotational moment about the Z-axis is applied to the manipulatable member 12 in the second embodiment. As is apparent from comparison between FIGS. 7Aa-7Ac and FIGS. 7Ba-7Bc, an amount of deformation on the deformable member 13 for the force sensing device 30 is greater than an amount of deformation on the deformable member 13 for the force sensing device 10.

In the force sensing device 10, the connecting member 14 has large rigidity. Therefore, when the moment Mz is transformed into the forces fz21 and fz31, and fz22 and fz32 by the connecting member 14, large reaction forces are adversely generated on the connecting member 14 itself. If such reaction forces are generated, an amount of deformation on the deformable member 13 resulting from the above-mentioned moment Mz becomes small. Therefore, resistance changes on the strain detecting elements 171a-173d, which form the bridge circuits, also become small. Therefore, detection sensitivity for the moment Mz is not so high.

However, in the force sensing device 30, the rigidity of the connecting member 34 is relatively small. Therefore, when the moment Mz is transformed into the forces fz21 and fz31, and fz22 and fz32, the connecting member 34 itself does not generate considerably large reaction forces. Since considerably large reaction forces are not generated, an amount of deformation on the deformable member 13 resulting from the moment Mz becomes comparatively large. Therefore, resistance changes on the strain detecting elements 171a-173d, which form the bridge circuits, does not become so small. As a result, it is possible to improve detection sensitivity for the moment Mz.

The first portion 34a is considered as a rigid body. The first portion 34a is directly linked with the shaft of the manipulatable member 12. The first portion 34a is located directly under the manipulatable member 12. Displacement of the first portion 34a is the same as that of the manipulatable member 12.

The second portion 34b is considered as a rigid body. A plurality of second portions 34b are arranged to make a pair. On the element disposed surface, the pair of the second portions 34b are orthogonally arranged with respect to the manipulatable member 12, i.e., the first portion 34a. A portion of the deformable member 13 connected with one of the second portions 34b and the other portion of the deformable member 13 connected with the other one of the second portions 34b are capable of being displaced independently each other. These two portions on the deformable member 13 may be provided by independent flat plates or independent beams. Independent strain detecting elements are disposed on these two portions.

The joint portion 34c provides the narrowest portion in the connecting member 34. The joint portion 34c may be considered as an elastic member having elasticity compared with the first portion 34a and the second portion 34b. A plurality of joint portions 34c are arranged to make a pair. On the element disposed surface, the pair of the joint portions 34c are orthogonally arranged with respect to the manipulatable member 12, i.e., the first portion 34a. The pair of joint portions 34c enables that paired second portions 34b are displaced in opposite directions each other. As a result, it is possible to increase a difference between a first displacement amount of the portion of the deformable member 13 to which one of the second portions 34b belongs, and a second displacement amount of the portion of the deformable member 13 to which the other one of the second portions 34b belongs.

Modification of Second Embodiment

Figure 8A:
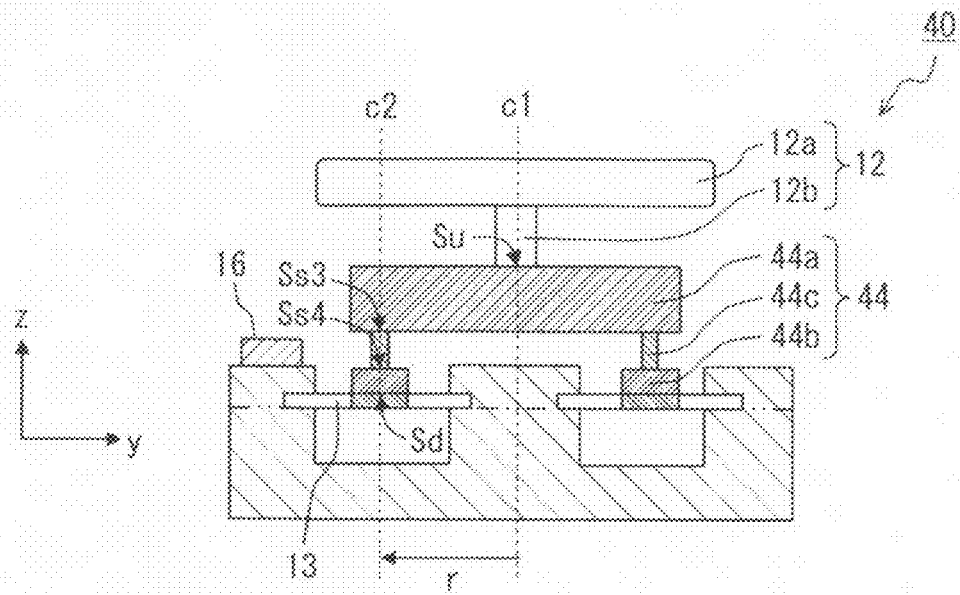
FIG. 8A is a sectional view of a force sensing device according to a modification of the second embodiment of the present invention, and shows a cross section VIII-A in FIG. 8B.
Figure 8B:
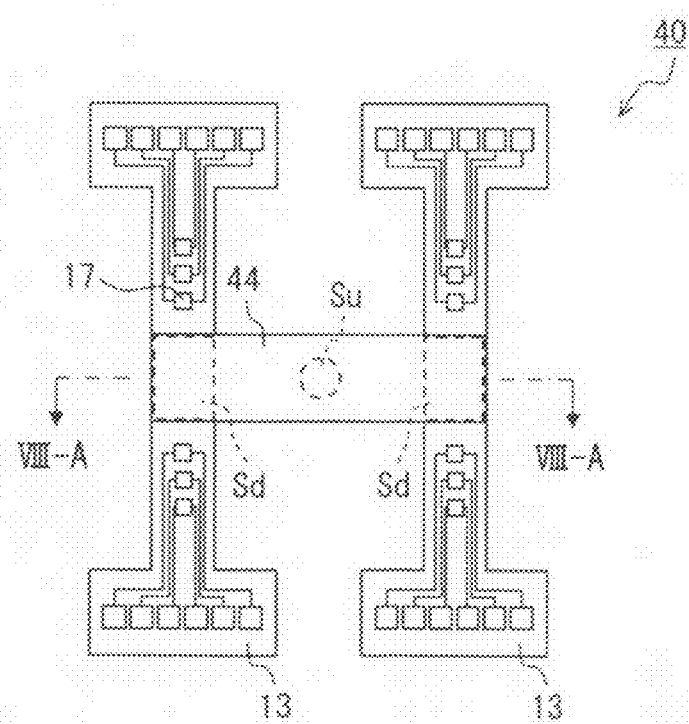
FIG. 8B is a plan view of the force sensing device according to the modification of the second embodiment of the present invention.

In the second embodiment, as shown in FIG. 6B, the joint portion 34c connects between the first portion 34a and the second portions 34b in the connected area Ss1 located in the substantial center of the side surface of the first portion 34a and in the connected area Ss2 located above with respect to the substantial center of the side surface of the second portion 34b. However, the location of the connected areas Ss1 and Ss2 are not limited to the above embodiment. For example, as shown in FIG. 8A and FIG. 8B, the joint portion 44c may be connected with a connected area Ss3 located on both ends of a bottom surface of the first portion 44a, and a connected area Ss4 located on a substantial center of a top surface of the second portion 44b. The force sensing device 40, which has the connecting member 44, can perform similar to the second embodiment, and is possible to improve detection sensitivity for the moment Mz.

In the second embodiment and its modification, as shown in FIG. 6B and FIG. 8B, respectively, the connecting members 34 and 44 are provided by combining a plurality of components. However, the connecting member is not limited to such a combined configuration. The connecting members 34 and 44 may be configured in a single unitary component similar to the connecting member 14 in the first embodiment. In this case, the connecting members 34 and 44 may have a narrower portion unitary formed with the first and second portions.

In the second embodiment and its modification, as shown in FIG. 6B and FIG. 8B, respectively, the deformable member 13 is provided with two plates having identical shape. However, the shape of the deformable member 13 is not limited to the identical shape. For example, a deformable member may be provided with two plates having different shapes from each other.

In the second embodiment and its modification, as shown in FIG. 6B and FIG. 8B, respectively, the deformable member 13 is provided with two plates having identical shape in order to improve manufacturing effectiveness. However, the shape of the deformable member is not limited to the above. The deformable member 23 formed in a single plate as shown in FIG. 5A and FIG. 5B may be used in the second embodiment and its modification. By using the deformable member 23, it is possible to decrease number of parts and make assembly steps easy.

Third Embodiment

Figure 9A:
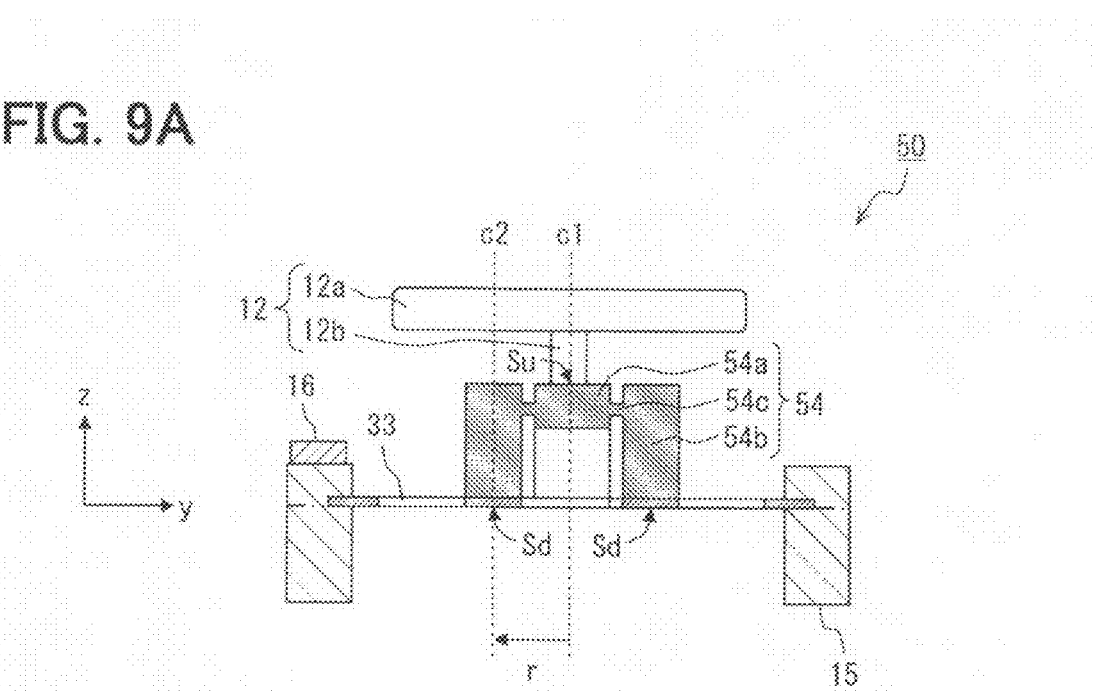
FIG. 9A is a sectional view of a force sensing device according to a third embodiment of the present invention, and shows a cross section IX-A in FIG. 9B.

Next, a third embodiment of the force sensing device according to the present invention is explained, referring to FIGS. 9A-10B. FIG. 9A and FIG. 9B are drawings corresponding to FIG. 1A and FIG. 1B respectively.

Figure 9B:
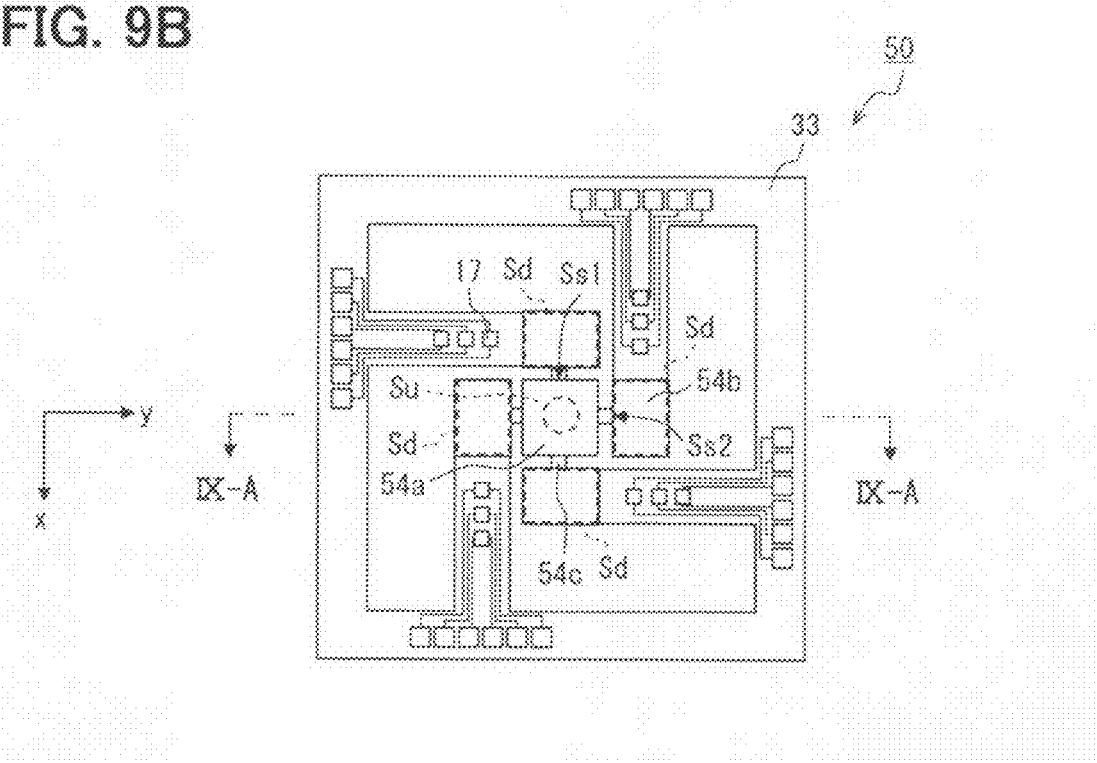
FIG. 9B is a plan view of the force sensing device according to the third embodiment of the present invention.

As shown in FIG. 9A and FIG. 9B, the third embodiment employs a deformable member 33 that is different in shape from the preceding embodiments. The deformable member 33 is formed in a single plate with swastika shape in a plan view. In other words, the deformation member 33 is provided with four rectangular plates arranged spirally. The deformable member 33 illustrated may be considered to have four cantilever beams which are arranged in a spiral shape. As the shape of the deformable member 33 differs, the third embodiment employs a connecting member 54 that is also different from the preceding embodiments. The remaining configuration of the third embodiment is the same as or similar to the configuration described in the preceding embodiments. Hereinafter, different portions from the preceding embodiments are mainly explained.

As shown in FIG. 9A, the connecting member 54 is constructed by combining a single piece of first portion 54a disposed on a manipulatable member side, four pieces of second portions 54b disposed on deformable member sides, and four pieces of joint portions 54c.

In detail, the first portion 54a is made of metallic materials, such as iron, aluminum, and stainless steel. The first portion 54a is formed in a square pillar shape. The first portion 54a has a connected area Su that is located on a substantial center on the upper surface and is firmly connected with the shaft 12b of the manipulatable member 12.

Similarly, the second portions 54b are made of metallic materials, such as iron, aluminum, and stainless steel. Each of the second portions 34b is formed in a square pillar shape. The second portion 34b has a connected area Sd that is whole bottom surface thereof and is firmly connected with the surface, i.e., the element disposed surface, of the deformable member 13. Four connected areas Sd are firmly connected to four rectangular plates respectively. The connected area Sd of the second portion 34b faces a distal end portion in a longitudinal direction of the rectangular plate on the deformable member 33.

The joint portions 54c are made of metallic materials, such as iron, aluminum, and stainless steel. Each of the joint portions 54c is formed in a columnar shape. The joint portion 54c is formed narrower than the first portion 54a and the second portion 54b. The joint portion 54c is formed so that a cross-sectional area in a cross section vertical to an axis thereof is apparently smaller than that of the first portion 54a and the second portion 54b. The first portion 54a has connected areas Ss1 that are located on substantial center of side surfaces of the first portion 54a and are firmly connected with corresponding one of the joint portions 54c respectively. Each of the second portions 54b has a connected area Ss2 that is located slightly above with respect to a substantial center of a side surface of the second portion 54b and is firmly connected with corresponding one of the joint portions 54c. In other words, the joint portion 54c is connected to the second portion 54b so as to extend a vertical distance between the connected area Sd and the connected area Ss2 as much as possible. When the applied force is applied to the grip portion 12a, since the joint portion 54c is formed narrower than the first portion 54a and the second portion 54b, the joint portion 54c is deformed, i.e., twisted, more greatly than the first portion 54a and the second portion 54b. The first portion 54a; the second portion 54b, and the joint portion 54c may be made of elastic materials other than the metallic material.

Figure 10A:
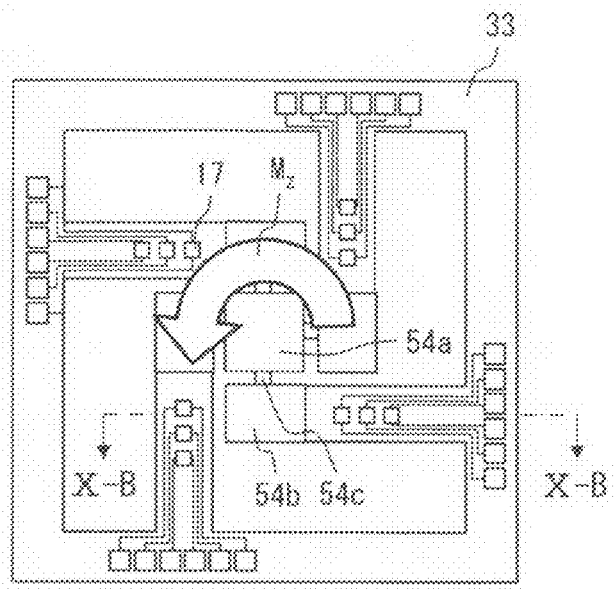
FIGS. 10A and 10B are drawings showing force components and moment components on each portions of the force sensing device according to the third embodiment of the present invention.
Figure 10B:
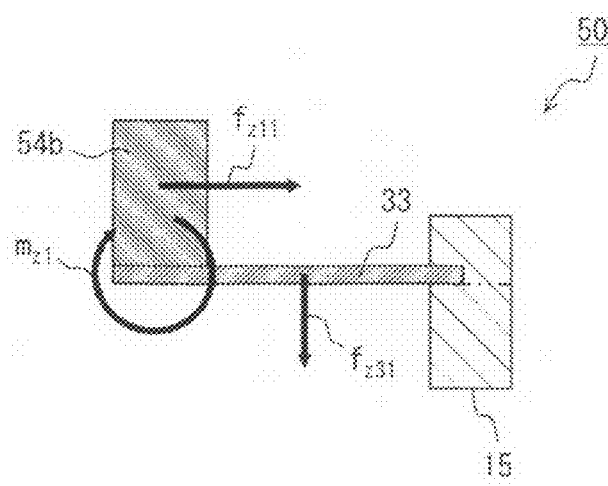

FIGS. 10A and 10B are drawings showing force components and moment components on each portions of the deformable member 33, in a case that the rotational moment about the Z-axis is applied to the manipulatable member 12.

Suppose that a user applies a rotational applied force Mz(counterclockwise), which is the moment Mz(counterclockwise), to the manipulatable member 12. At this time, the moment Mz(counterclockwise) is transmitted to the connecting member 54 through the shaft 12b, and acts on the connecting member 54, i.e., the first portion 54a, as shown in FIG. 2Cb. If the moment Mz acts on the first portion 54a, the moment Mz is transmitted to the second portions 54b through the joint portions 54c. Force fz11 acts on the second portions 54b in the plus direction of the Y-axis. Here, since the connecting member 54 is firmly connected with the deformable member 33. Therefore, if the force fz11 in the plus direction of the Y-axis acts on the second portion 54b, a force fz31 in the minus direction of the Z-axis acts on the element disposed area located on a right side of the second portion 54b. As mentioned above, the force fz11 is transformed into the force fz31 vertical to the surface of the deformable member 33. The force fz31 acts on the deformable member 33. The forces fz11 and fz31 acting thereon generate a moment mz1 rotational about a center of the connected area Sd of the second portion 54b.

In the third embodiment, the element disposed surfaces on the deformable member 33 are placed on the same plane similar to the preceding embodiments. Furthermore, the strain detecting elements 17 are disposed on the element disposed surfaces placed on the same plane. Therefore, it is possible to perform wiring work easily. It is possible to manufacture the force sensing device 50 in low cost. It is possible to detect the moment Mz acting about the shaft 12b of the manipulatable member 12 by using the element disposed surfaces placed on the same plane. As a result, the applied force of three degrees of freedom can be detected.

In the third embodiment, as shown in FIG. 9B, the connecting member 54 is provided by combining a plurality of components. However, the connecting member is not limited to such a combined configuration. The connecting members 54 may be configured in a single unitary component similar to the connecting member 14 in the first embodiment. In this case, the connecting member 54 may have a narrower portion unitary formed with the first and second portions. In this case, the joint portion 54c is not provided as an independent member.

In the third embodiment, as shown in FIG. 9B, the deformable member 33 is made of a single plate. However, the shape of the deformable member 33 is not limited to the above. For example, the deformable member 33 may be divided into two parts or four parts. The deformable member 23 may be made of a plurality of plates.

Fourth Embodiment

Figure 11A:
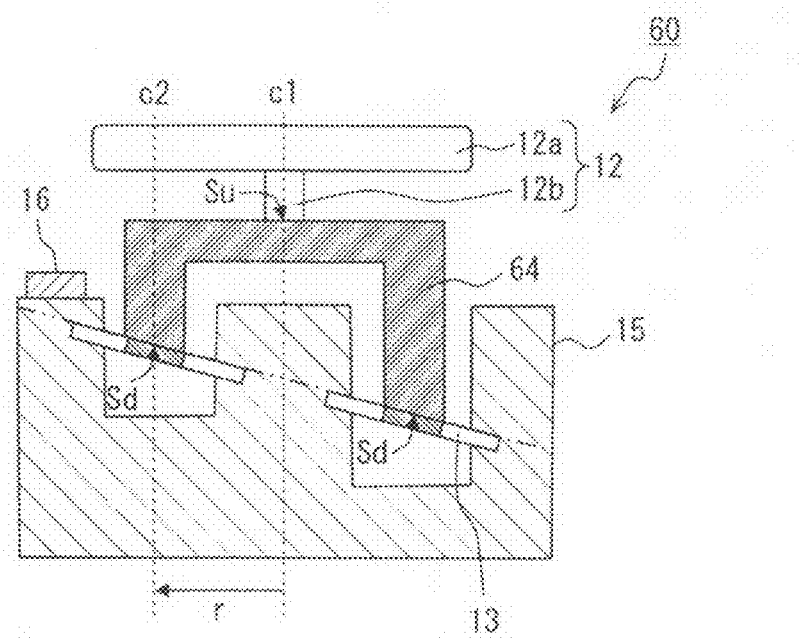
FIG. 11A is a sectional view of a force sensing device according to a fourth embodiment of the present invention, and shows a cross section XI-A in FIG. 11B.
Figure 11B:
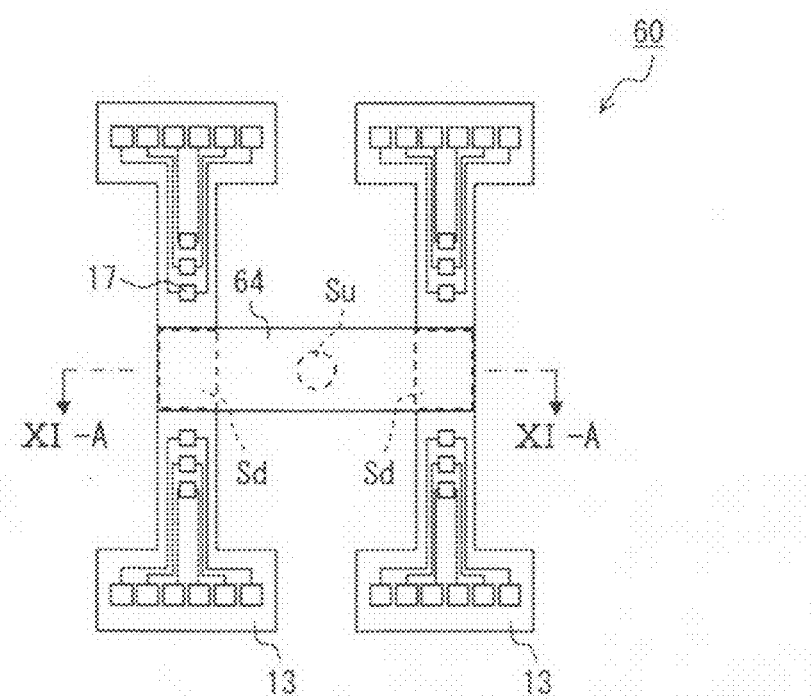
FIG. 11B is a plan view of the force sensing device according to the fourth embodiment of the present invention.

Next, a fourth embodiment of the force sensing device according to the present invention is explained, referring to FIGS. 11A-12B. FIG. 11A and FIG. 11B are drawings corresponding to FIG. 1A and FIG. 1B respectively.

In the preceding embodiments, the connecting members 14, 34, 44 and 54 firmly connects between the shaft 12b of the manipulatable members 12 and the element disposed surfaces of the deformable members 13, 23 and 33 so that the shaft 12b of the manipulatable member 12 is placed to define a right angle with respect to the surfaces of the deformable members 13, 23 and 33.

Alternatively, in this fourth embodiment, the connecting member 64 firmly connects between the shaft 12b of the manipulatable members 12 and the surfaces of the deformable member 13 so that the shaft 12b of the manipulatable member 12 is placed to define a predetermined angular inclination with respect to the surfaces of the deformable member 13. The remaining configuration of the fourth embodiment is the same as or similar to the configuration described in the preceding embodiments.

Figure 12A:
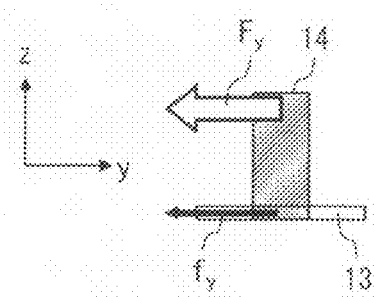
FIG. 12A is a sectional view showing force acting on a deformable member when force is applied in a minus direction on the Y-axis, in a case that the shaft of the manipulatable member and an element disposed surface of the deformable member are firmly connected so that the shaft of the manipulatable member defines a right angle with respect to the element disposed surface of the deformable member.
Figure 12B:
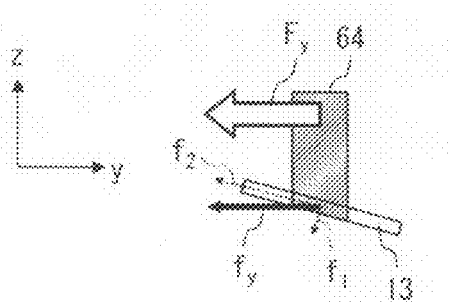
FIG. 12B is a sectional view showing force acting on a deformable member when force is applied in a minus direction on the Y-axis, in a case that the shaft of the manipulatable member and an element disposed surface of the deformable member are firmly connected so that the shaft of the manipulatable member defines a predetermined angle inclination with respect to the element disposed surface of the deformable member.

FIG. 12A is a sectional view showing force acting on a deformable member 13 when force is applied in a minus direction on the Y-axis, in a case that the shaft 12b of the manipulatable member 12 and an element disposed surface of the deformable member 13 are firmly connected so that the shaft 12b of the manipulatable member 12 defines a right angle with respect to the element disposed surface of the deformable member 13. That is, FIG. 12A shows the preceding embodiments. FIG. 12B is a sectional view showing force acting on a deformable member 13 when force is applied in a minus direction on the Y-axis, in a case that the shaft 12b of the manipulatable member 12 and an element disposed surface of the manipulatable member 12 are firmly connected so that the shaft 12b of the manipulatable member 12 defines a predetermined angle inclination with respect to the element disposed surface of the deformable member 13. That is, FIG. 12B shows the fourth embodiment. The predetermined angle inclination means that the element disposed surface of the deformable member 13 is inclined less than a right angle, preferably less than 45 degrees, with respect to the horizontal plane when the shaft 12b is placed vertically.

Suppose that a user applies a linear applied force Fy(−) to the manipulatable member 12 shown in FIG. 12A. In a case of FIG. 12A, the applied force Fy acts on the deformable member 13 as a force fy which acts in a direction parallel to the element disposed surface of the deformable member 13.

On the other hand, suppose that a user applies a linear applied force Fy(−) to the manipulatable member 12 shown in FIG. 12B. In a case of FIG. 12B, the applied force Fy acts on the deformable member 13 is decomposed into a force fy1 acting in a direction vertical to the element disposed surface of the deformable member 33 and a force fy2 acting in a direction parallel to the element disposed surface of the deformable member 33. Both the components fy1 and fy2 act on the deformable member 13. As a result, it is possible to increase an amount of deformation of the deformable member 33 to a direction which intersects the element disposed surface of the deformable member 33. In detail, force components acting along the Y-axis and the Z-axis are increased. It is possible to enhance an amount of deformation of the deformable member 33 responsive to a specific applied force. Therefore, it is possible to improve detection sensitivity to the specific applied force.

Fifth Embodiment

Figure 13:
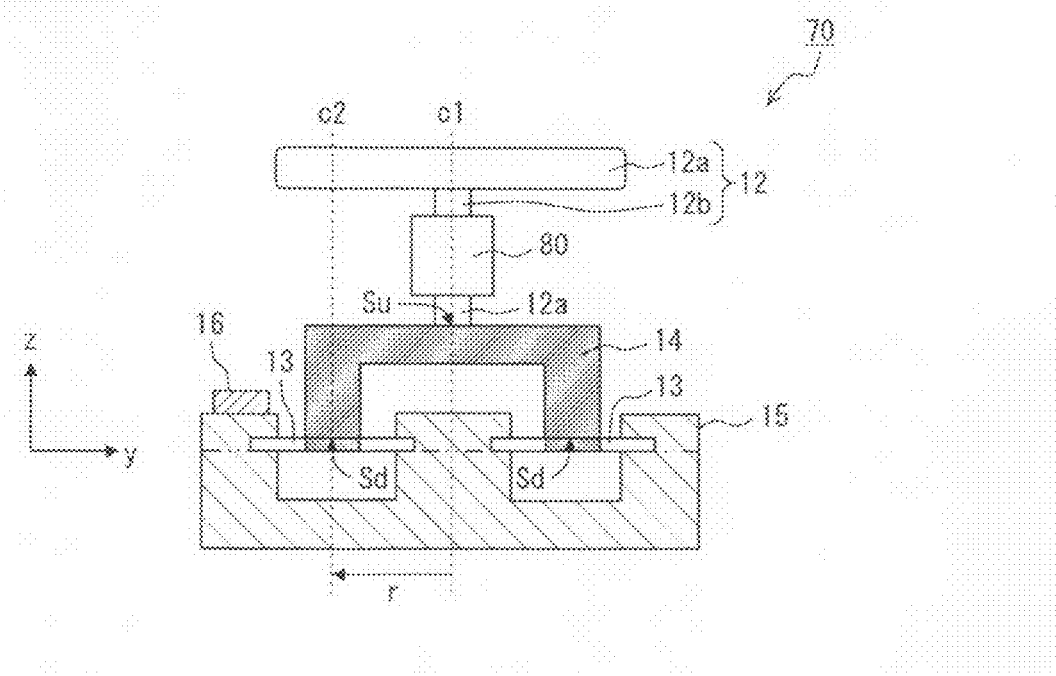
FIG. 13 is a plan view of a force sensing device according to a fifth embodiment of the present invention.

Next, a fifth embodiment of the force sensing device according to the present invention is explained, referring to FIG. 13. FIG. 13 is a drawing corresponding to FIG. 1A.

As shown in FIG. 13, in the fifth embodiment, an elastic member 80 is disposed in the shaft 12b of the manipulatable member 12. The elastic member 80 divides the shaft 12b into an upper part and a lower part, and connects the parts. The elastic member 80 is elastically deformed according to the applied force applied on the manipulatable member 12, and still transmits the applied force to the connecting member 14. The remaining configuration of the fifth embodiment is the same as or similar to the configuration described in the preceding embodiments.

In detail, the elastic member 80 is made of elastic material or elastic component, such as rubber, a coil spring, etc., which can be elastically deformed by the applied force that is human being's power. The elastic member 80 enables the manipulatable member 12 to be displaced largely in response to the applied force. The elastic member 80 still transmits sufficient force to deform the deformable member 13. Therefore, the operator of the manipulatable member 12 can easily and clearly understand and recognize that he/she actually applies force on the manipulatable member 12. Although it is difficult to check visually for human being, the applied force applied on the manipulatable member 12 is transmitted to the deformable member 13 through the connecting member 14 in both cases where there is the elastic member 80 and there is no elastic member.

Sixth Embodiment

Figure 14A:
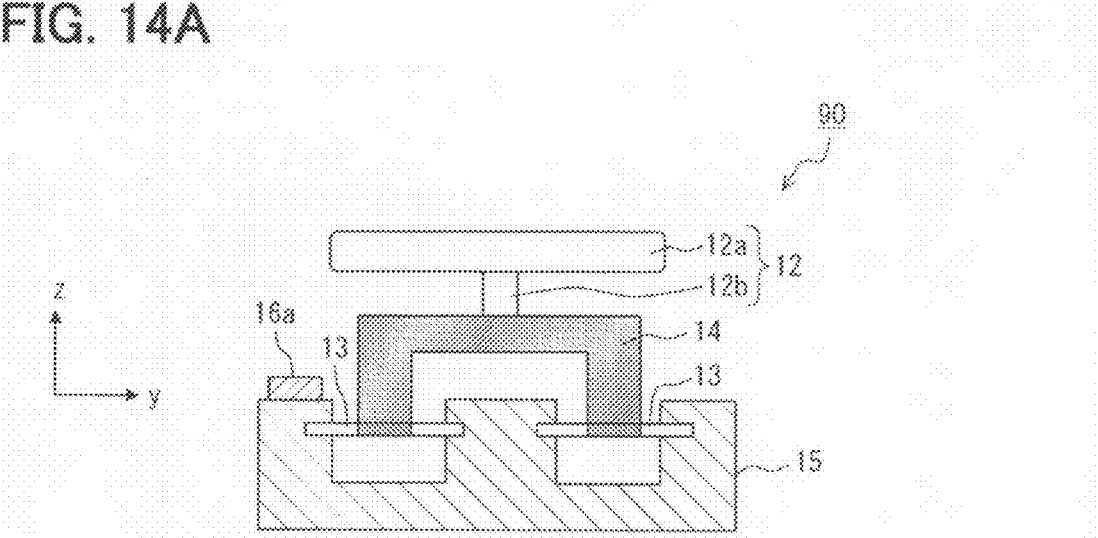
FIG. 14A is a sectional view of a force sensing device according to a sixth embodiment of the present invention, and shows a cross section XIV-A in FIG. 14B.

Next, a force sensing device according to a sixth embodiment of the present invention is explained by referring to FIG. 14A through FIG. 19. FIGS. 14A and 14B are drawings corresponding to FIGS. 1A and 1B. FIG. 14A is a sectional view of the force sensing device 90 according to the sixth embodiment of the present invention, and shows a cross section XIV-A in FIG. 14B. FIG. 14B is a plan view of the force sensing device 90. A configuration of the force sensing device 90 is explained with reference to FIG. 14A and FIG. 14B.

Figure 14B:
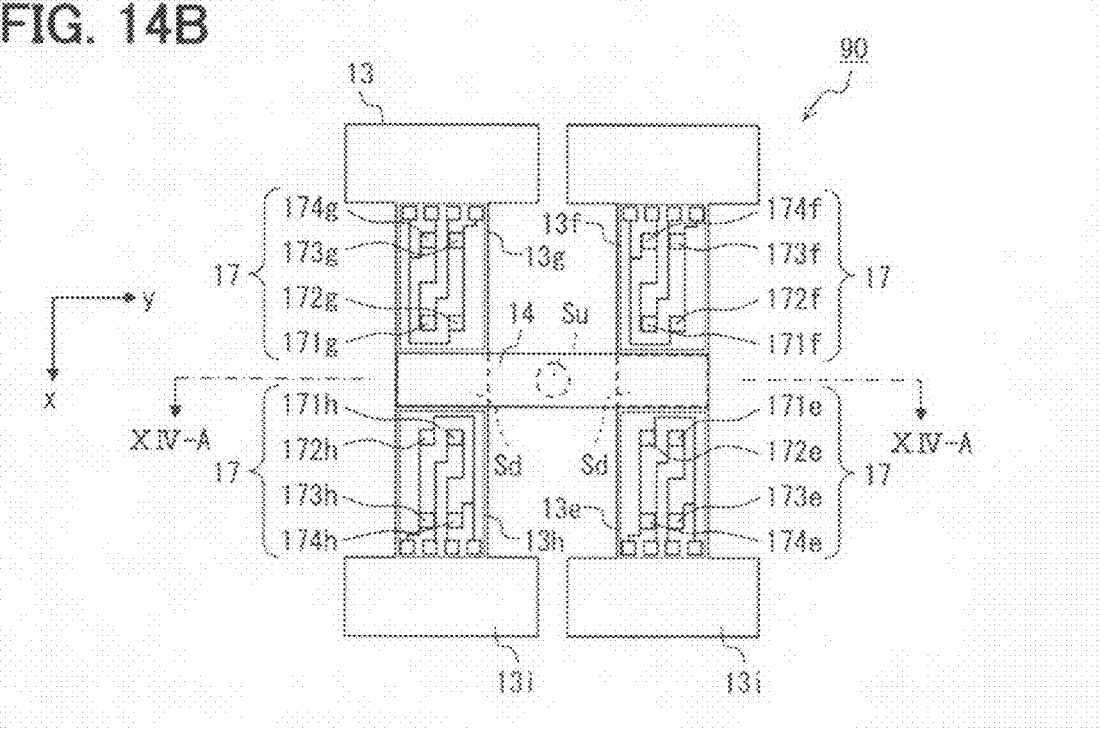
FIG. 14B is a plan view of the force sensing device according to the sixth embodiment of the present invention.

In the first embodiment, a total of 12 strain detecting elements are arranged on the surface of the deformable member 13. As shown in FIGS. 14A and 14B, in the sixth embodiment, however, four strain detecting sections each of which includes four strain detecting elements are arranged on the surface of the deformable member 13. That is, a total of 16 strain detecting elements are arranged on the surface of the deformable member 13. In other words, the force sensing device 90 includes four groups of the strain detecting elements. The remaining configuration of the sixth embodiment is the same as or similar to the configuration described in the preceding embodiments. Hereinafter, different portions from the first embodiment are mainly explained.

As shown in FIG. 14B, the deformable member 13 is provided with two plates which are formed in an I-shape in a plan view respectively and are arranged on the same plane so that both surfaces of the plates are placed to form a single plane. The deformable member 13 is elastically deformed in a direction perpendicular to the surface of the deformable member 13 (the Z-axis) according to the applied force that is applied on the manipulatable member 12. The deformable member 13 is elastically deformed in different forms according to directions of the applied force. Four strain detecting sections 17e-17h are arranged on the surface, which is an upper surface, of the deformable member 13. Each of the strain detecting section 17e-17h includes four strain detecting elements 171e-174h. Four strain detecting elements 171e-174h on each one of the strain detecting sections 17e-17h, e.g., the strain detecting elements 171g, 172g, 173g and 174g, are electrically connected to form a bridge circuit 18e-18g, e.g., the bridge circuit 18g shown in FIG. 18. A plurality of wiring patterns and a plurality of electrodes are formed on the surface of the deformable member 13. The wiring patterns and electrodes are used to assemble the bridge circuits of the strain detecting elements.

The deformable member 13 includes four arm portions arranged in an H-shape which are referred to as a first portion 13e, a second portion 13f, a third portion 13g, and a fourth portion 13h. The first portion 13e is a part located on a side in the plus direction of the X-axis from the connecting member 14 on the I-shaped plate which is located on a side in the plus direction of the Y-axis from the shaft 12b of the manipulatable member 12. The second portion 13f is a part located on a side in the minus direction of the X-axis from the connecting member 14 on the I-shaped plate which is located on a side in the plus direction of the Y-axis from the shaft 12b of the manipulatable member 12. The third portion 13g is a part located on a side in the minus direction of the X-axis from the connecting member 14 on the I-shaped plate which is located on a side in the minus direction of the Y-axis from the shaft 12b of the manipulatable member 12. The fourth portion 13h is a part located on a side in the plus direction of the X-axis from the connecting member 14 on the I-shaped plate which is located on a side in the minus direction of the Y-axis from the shaft 12b of the manipulatable member 12. Each of the I-shaped plate has a pair of fixing portions 13i and 13i on both longitudinal ends thereof. The fixing portion 13i is wider in the Y-axis direction than the other portion, such as the above mentioned first to fourth portions 13e-13h. The fixing portion 13i is a part to be fixed to the housing 15.

The strain detecting section 17e is arranged on the first portion 13e. Four strain detecting elements 171e-171e providing the strain detecting section 17e are the strain detecting elements for detecting the elastic deformation in the Z-axis direction on the first portion 13e caused by the applied force applied on the manipulatable member 12. The strain detecting section 17f is arranged on the second portion 13f. Four strain detecting elements 171f-171f providing the strain detecting section 17f are the strain detecting elements for detecting the elastic deformation in the Z-axis direction on the second portion 13f caused by the applied force applied on the manipulatable member 12. The strain detecting section 17g is arranged on the third portion 13g. Four strain detecting elements 171g-171g providing the strain detecting section 17g are the strain detecting elements for detecting the elastic deformation in the Z-axis direction on the third portion 13g caused by the applied force applied on the manipulatable member 12. The strain detecting section 17h is arranged on the fourth portion 13h. Four strain detecting elements 171h-171h providing the strain detecting section 17h are the strain detecting elements for detecting the elastic deformation in the Z-axis direction on the fourth portion 13h caused by the applied force applied on the manipulatable member 12. An arrangement of locations of the strain detecting elements 171e-174e on the surface of the first portion 13e is described later. An arrangement of locations of the strain detecting elements 171f-174f on the surface of the first portion 13f is described later. An arrangement of locations of the strain detecting elements 171g-174g on the surface of the first portion 13g is described later. An arrangement of locations of the strain detecting elements 171h-174h on the surface of the first portion 13h is described later.

The signal processing part 16a provides four bridge circuits 18e-18h. Each of the bridge circuits 18e-18h is formed with four strain detecting elements 171e-174h. The signal processing part 16a detects the applied force which acts on the manipulatable member 12 based on detection signals from the bridge circuits 18e-18h. The bridge circuits 18e-18h and the signal processing part 16a are described later.

Figure 16C:
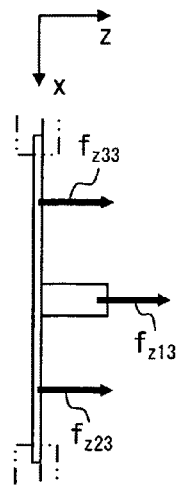
FIG. 16Ca is a sectional view of a left side part when the force Fz is applied.
Figure 16C:
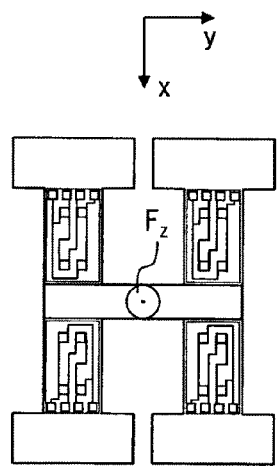
Figure 16C:
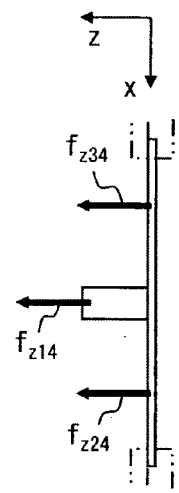
Figure 16D:
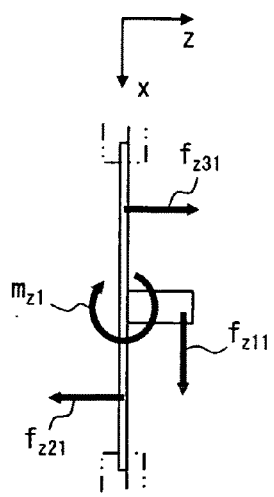
FIG. 16Da is a sectional view of a left side part when the moment Mz is applied.
Figure 16D:
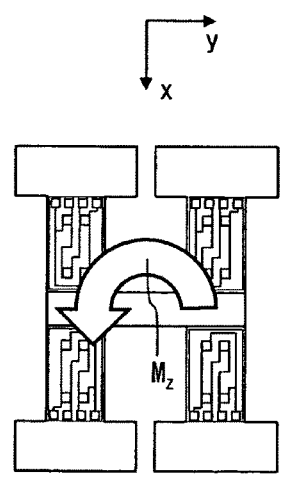
Figure 16D:
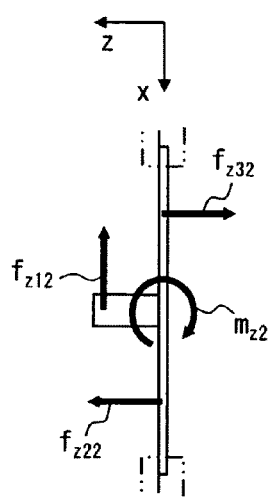

Operation of the force sensing device 90 is explained referring to FIGS. 15Aa, 15Ab and 15Ac, FIGS. 15Ba, 15Bb and 15Bc, FIGS. 16Ca, 16Cb and 16Cc, and FIGS. 16Da, 16Db and 16Dc. FIGS. 15Aa, 15Ab and 15Ac show components of force acting on the deformable member 13, which includes four portions 13e-13h, when the applied force in the plus direction of the X-axis acts on the manipulatable member 12. FIGS. 15Ba, 15Bb and 15Bc show components of force acting on the deformable member 13, which includes four portions 13e-13h, when the applied force in the plus direction of the Y-axis acts on the manipulatable member 12. FIGS. 16Ca, 16Cb and 16Cc show components of force acting on the deformable member 13, which includes four portions 13e-13h, when the applied force in the plus direction of the Z-axis acts on the manipulatable member 12. FIGS. 16Ba, 16Bb and 16Bc show components of force acting on the deformable member 13, which includes four portions 13e-13h, when the applied force of rotating moment in the counterclockwise direction about the Z-axis acts on the manipulatable member 12. FIGS. 15Aa, 15Ab and 15Ac, FIGS. 15Ba, 15Bb and 15Bc, and FIGS. 16Da, 16Db and 16Dc are the same as corresponding one of FIGS. 2Aa, 2Ab and 2Ac, FIGS. 2Ba, 2Bb and 2Bc, and FIGS. 2Ca, 2Cb and 2Cc. Therefore, redundant explanations for those drawings are omitted.

Suppose that a user applies a linear applied force in the plus direction of the Z-axis to the manipulatable member 12. The applied force in the plus direction of the Z-axis is referred to as Fz(+). In this case, the applied force Fz(+) is transmitted to the connecting member 14 through the shaft 12b, and acts on the connecting member 14 as shown in FIG. 16Cb. In this case, the user pulls the manipulatable member 14 up. When the applied force Fz acts on the connecting member 14, a force fz13 acts on the left side part of the connecting member 14 in the plus direction of the Z-axis, and a force fz14 acts on the right side part of the connecting member 14 in the plus direction of the Z-axis. The connecting member 14 is firmly connected with the deformable member 13. Therefore, if the force fz13 acts on the left side part of the connecting member 14, a force fz23 in the plus direction of the Z-axis acts on an element disposed area of the deformable member 13 located on a side to the plus direction of the X-axis from the left side part of the connecting member 14, i.e., on the fourth portion 13h. Simultaneously, a force fz33 in the plus direction of the Z-axis acts on the element disposed area of the deformable member 13 located on a side to the plus direction of the X-axis from the left side part of the connecting member 14, i.e., on the fourth portion 13h. Similarly, if a force fz14 acts on the right side part of the connecting member 14, a force fz24 in the plus direction of the Z-axis acts on an element disposed area of the deformable member 13 located on a side to the plus direction of the X-axis from the right side part of the connecting member 14, i.e., on the first portion 13e. Simultaneously, a force fz34 in the plus direction of the Z-axis acts on the element disposed area of the deformable member 13 located on a side to the minus direction of the X-axis from the right side part of the connecting member 14, i.e., on the second portion 13f. As mentioned above, the applied force Fz(+) is transformed into a pair of forces fz23 and fz33, and a pair of forces fz24 and fz34, all vertical to the surface of the deformable member 13. The forces act on the deformable member 13.

FIG. 17A is an enlarged plan view of the third portion 13g including the fixing portion 13i. FIG. 17B is an enlarged view showing a deformed form of the strain detecting elements 171g-174g viewing from the side of the deformable member 13, when the third portion 13g is deformed in the plus direction of the Z-axis in response to the force fz13 applied in the plus direction of the Z-axis. In each portions 13e-13h, two strain detecting elements 171 and 172 are arranged on a region close to the connection portion to the connecting member 14, and two strain detecting elements 173 and 174 are arranged on a region close to the fixing portion 13i. In the third portion 13g, two strain detecting elements 171g and 172g are arranged on a region close to the connection portion to the connecting member 14, and two strain detecting elements 173g and 174g are arranged on a region close to the fixing portion 13i.

As shown in FIG. 17B, as the third portion 13g is elastically deformed in the plus direction of the Z-axis, a tension force acts on both the strain detecting elements 171g and 172g. On the other hand, as the third portion 13g is elastically deformed in the plus direction of the Z-axis, a compression force acts on both the strain detecting elements 173g and 174g. Although it is not illustrated, as the third portion is elastically deformed in the minus direction of the Z-axis, a compression force acts on both the strain detecting elements 171g and 172g, and a tension force acts on both the strain detecting elements 173g and 174g. Thus, both the strain detecting elements 171g and 172g are arranged on the upper surface of the third portion 13g so that the strain detecting elements 171g and 172g receive a tension force as the third portion 13g deforms in the plus direction of the Z-axis and the strain detecting elements 171g and 172g receive a compression force as the third portion 13g deforms in the minus direction of the Z-axis. In addition, both the strain detecting elements 173g and 174g are arranged on the upper surface of the third portion 13g so that the strain detecting elements 173g and 174g receive a compression force as the third portion 13g deforms in the plus direction of the Z-axis and the strain detecting elements 173g and 174g receive a tension force as the third portion 13g deforms in the minus direction of the Z-axis.

The strain detecting elements 171e-174e are arranged on the first portion 13e in the same manner as described above. The strain detecting elements 171f-174f arranged on the second portion 13f, and the strain detecting elements 171h-174 arranged on the forth portion 13h are also arranged in the same manner.

Such an arrangement of locations of the strain detecting elements 171e-174g may be determined according to a distance from the connecting member 14 to the fixing portion 13i, and are not affected by other factors, such as magnitude of the applied force which acts on the deformable member 13, i.e., magnitude of the applied force which acts on the manipulatable member 12, material of the deformable member 13, and the X-Y sectional shape of the deformable member 13, in view of the strength of materials. An arrangement of locations of the strain detecting elements 171e-174g can be determined by using known methods, for example CAE (Computer Aided Engineering.)

FIG. 18A is a drawing which shows a table of resistance changes of the strain detecting elements 171g-174g in a case that the strain detecting elements 171g-174g are arranged on the surface of the third portion 13g as described above, and the third portion 13g is elastically deformed in the plus direction of the Z-axis.

As shown in FIG. 18A, if the third portion 13g is elastically deformed in the plus direction of the Z-axis, resistance values of the strain detecting elements 171g and 172g increase in response to the tension force. On the contrary, if the third portion 13g is elastically deformed in the plus direction of the Z-axis, resistance values of the strain detecting elements 173g and 174g decrease in response to the compression force. Although it is not illustrated, as the third portion is elastically deformed in the minus direction of the Z-axis, resistance values of the strain detecting elements 171g-174g are changed in opposite directions.

In addition, although it is not illustrated, resistance values of the strain detecting elements 171e-174e, resistance values of the strain detecting elements 171f-174f, and resistance values of the strain detecting elements 171h-174h are similarly changed as described above.

As explained above, each one of the strain detecting sections 17e-17h includes a first strain detecting element and a second strain detecting element. The first and second strain detecting element show opposite responses to the same deformation of the deformable member 13. In detail, the force detecting device includes four strain detecting sections. Each section includes at least the first strain detecting element and the second strain detecting element. The first strain detecting element is arranged on the plane so that resistance of the first strain detecting element increases as the first strain detecting element is deformed according to a predetermined deformation of the deformable member 13. The second strain detecting element is arranged on the plane so that resistance of the second strain detecting element decreases as the second strain detecting element is deformed according to the predetermined deformation of the deformable member 13 that is the same as the deformation which causes increasing in resistance of the first strain detecting element.

FIG. 18B is a circuit diagram showing the bridge circuit 18g in which the strain detecting elements are arranged to detect the applied force based on the above mentioned resistance changes shown in FIG. 18A. The bridge circuit 18g has a diagonally arranged pair of strain detecting elements which show resistance changes in the same direction in response to the deformation of the deformable member 13. The bridge circuit 18g has two pairs of strain detecting elements. As shown in FIG. 18B, the bridge circuit 18g has a diagonally arranged first pair of strain detecting elements 171g and 172g which show resistance changes in the same direction in response to the elastic deformation of the third portion 13g in the Z-axis. The bridge circuit 18g also has a diagonally arranged second pair of strain detecting elements 173g and 174g which show resistance changes in the same direction in response to the elastic deformation of the third portion 13g in the Z-axis. The first pair of strain detecting elements 171g and 172g and the second pair of strain detecting elements 173g and 174g show opposite changes in resistance.

The strain detecting elements 171e-174e are arranged to form a bridge circuit 18e in the same manner as described above. The strain detecting elements 171f-174f are arranged to form a bridge circuit 18f in the same manner as described above. The strain detecting elements 171h-174h are arranged to form a bridge circuit 18h in the same manner as described above.

Each of the bridge circuits 18e-18h outputs positive output voltage Vout when each of the portions 13e-13h is elastically deformed in the plus direction of the Z-axis, respectively. Each of the bridge circuits 18e-18h outputs negative output voltage Vout when each of the portions 13e-13h is elastically deformed in the minus direction of the Z-axis, respectively.

FIG. 19 is a drawing which shows a table of combinations of output voltage polarities from the bridge circuits 18e-18h with respect to each applied forces distinguishable in this embodiment. The positive output voltage Vout is shown by the symbol "+". The negative output voltage Vout is shown by the symbol "−".

In the example of operation shown in FIGS. 15Aa, 15Ab and 15Ac where the applied force Fx(+) is applied, the bridge circuits 18e-18h output a combination of polarities of the output voltage Vout shown in the first line in FIG. 19, respectively. In detail, since the second portion 13f and the third portion 13g are elastically deformed in the plus direction of the Z-axis, the output voltage Vout of the bridge circuit 18f and the output voltage Vout of the bridge circuit 18g are positive outputs. On the other hand, since the first portion 13e and the fourth portion 13h are elastically deformed in the minus direction of the Z-axis, the output voltage Vout of the bridge circuit 18e and the output voltage Vout of the bridge circuit 18h are negative outputs. In a case that the applied force Fx(−) is applied to the manipulatable member 12, the bridge circuits 18e-18h output a combination of polarities of the output voltage Vout shown in the second line in FIG. 19, respectively.

In the example of operation shown in FIGS. 15Ba, 15Bb and 15Bc where the applied force Fy(+) is applied, the bridge circuits 18e-18h output a combination of polarities of the output voltage Vout shown in the third line in FIG. 19, respectively. In detail, since the third portion 13g and the fourth portion 13h are elastically deformed in the plus direction of the Z-axis, the output voltage Vout of the bridge circuit 18g and the output voltage Vout of the bridge circuit 18h are positive outputs. On the other hand, since the first portion 13e and the second portion 13f are elastically deformed in the minus direction of the Z-axis, the output voltage Vout of the bridge circuit 18e and the output voltage Vout of the bridge circuit 18f are negative outputs. In a case that the applied force Fy(−) is applied to the manipulatable member 12, the bridge circuits 18e-18h output a combination of polarities of the output voltage Vout shown in the fourth line in FIG. 19, respectively.

In the example of operation shown in FIGS. 16Ca, 16Cb and 16Cc where the applied force Fz(+) is applied, the bridge circuits 18e-18h output a combination of polarities of the output voltage Vout shown in the fifth line in FIG. 19, respectively. In detail, since the portions 13e-13h are elastically deformed in the plus direction of the Z-axis, the output voltage Vout of the bridge circuit 18e-18h are positive outputs. In a case that the applied force Fz(−) is applied to the manipulatable member 12, the bridge circuits 18e-18h output a combination of polarities of the output voltage Vout shown in the sixth line in FIG. 19, respectively.

In the example of operation shown in FIGS. 16Da, 16Db and 16Dc where the moment Mz(counterclockwise) is applied, the bridge circuits 18e-18h output a combination of polarities of the output voltage Vout shown in the seventh line in FIG. 19, respectively. In detail, since the first portion 13e and the third portion 13g are elastically deformed in the plus direction of the Z-axis, the output voltage Vout of the bridge circuit 18e and the output voltage Vout of the bridge circuit 18g are positive outputs. On the other hand, since the second portion 13f and the fourth portion 13h are elastically deformed in the minus direction of the Z-axis, the output voltage Vout of the bridge circuit 18f and the output voltage Vout of the bridge circuit 18h are negative outputs. In a case that the moment Mz(clockwise) is applied to the manipulatable member 12, the bridge circuits 18e-18h output a combination of polarities of the output voltage Vout shown in the eighth line in FIG. 19, respectively.

The signal processing part 16a discriminates combinations of polarities of the output voltage Vout from the bridge circuits 18e-18h for discriminating four kinds of the applied force. In detail, the signal processing part 16a discriminates eight combinations for discriminating a positive direction and a negative direction of the four kinds of the applied force. Four kinds of the applied force are forces defined with respect to the plane where the manipulatable member 12 is placed, and includes the applied force in the X-axis of the plane, the applied force in the Y-axis of the plane, the applied force rotational about the Z-axis on the plane, and the applied force in the Z-axis on the plane. The signal processing part 16a discriminates the plus direction and the minus direction of each one of the applied forces. As mentioned above, it is possible to detect the applied forces in four degrees of freedom which includes the applied force in the X-axis direction, the applied force in the Y-axis direction, the applied force rotational about the Z-axis, and the applied force in the Z-axis direction. That is, according to this embodiment, it is possible to detect the applied forces in four degrees of freedom that is more than three degrees of freedom in the first embodiment.

In addition, the amount of elastic deformation in the Z-axis direction of the deformable member 13 is proportional to the magnitude of the applied force applied on the manipulatable member 12. The magnitude of the output voltage Vout in each of the bridge circuits 18e-18h is proportional to the amount of elastic deformation in the Z-axis direction of the deformable member 13, i.e., the amount of strain. Therefore, the magnitude of the output voltage Vout in each of the bridge circuits 18e-18h is proportional to the magnitude of the applied force applied on the manipulatable member 12. Therefore, the signal processing part 16a can also detect the magnitude of the applied forces in four degrees of freedom based on the magnitude of the output voltage Vout in each of the bridge circuits 18e-18h. In the embodiment, the strain detecting elements provide at least four strain detecting sections. Each strain detecting section includes a first strain detecting element and a second strain detecting element. The first strain detecting element is arranged on the plane so that resistance of the first strain detecting element increases as the first strain detecting element is deformed according to the deformation of the deformable member. The second strain detecting element is arranged on the plane so that resistance of the second strain detecting element decreases as the second strain detecting element is deformed according to the deformation of the deformable member. As a result, it is possible to detect the applied force in the direction vertical to the element disposed surface of the deformable member.

As explained above, in the sixth embodiment, the device includes the deformable member 13 on which four strain detecting sections 17e-17h, each of which includes four strain detecting elements 171e-174h, are arranged, respectively. That is, the deformable member 13 includes a total of 16 strain detecting elements on one surface thereof. Thereby, the device can detect the applied forces in four degrees of freedom which includes the applied force in the X-axis direction, the applied force in the Y-axis direction, and the applied force rotational about the Z-axis, and, in addition, the applied force in the Z-axis direction.

Seventh Embodiment

Figure 20:
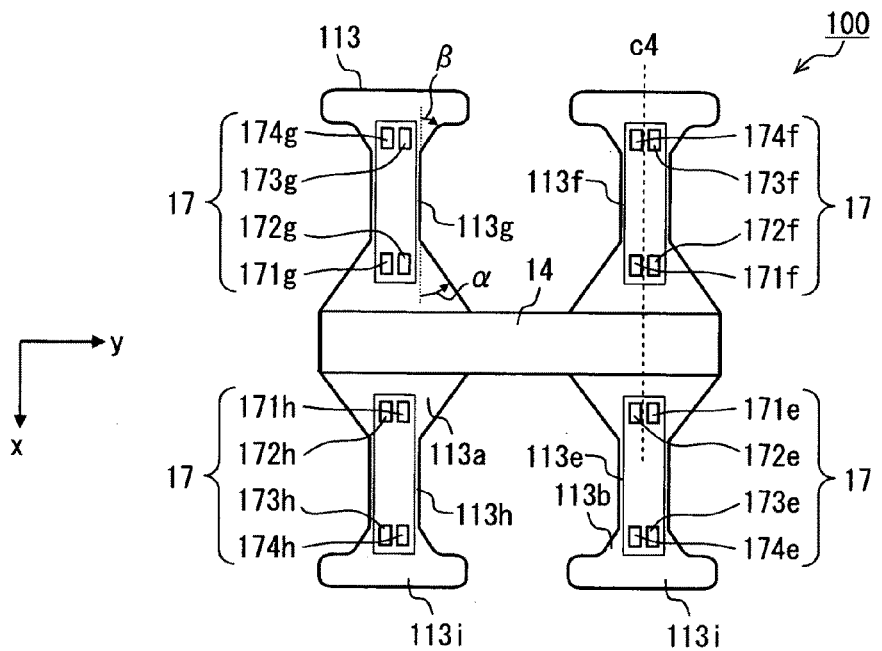
FIG. 20 is a plan view of a force sensing device according to a seventh embodiment of the present invention.
Figure 21:
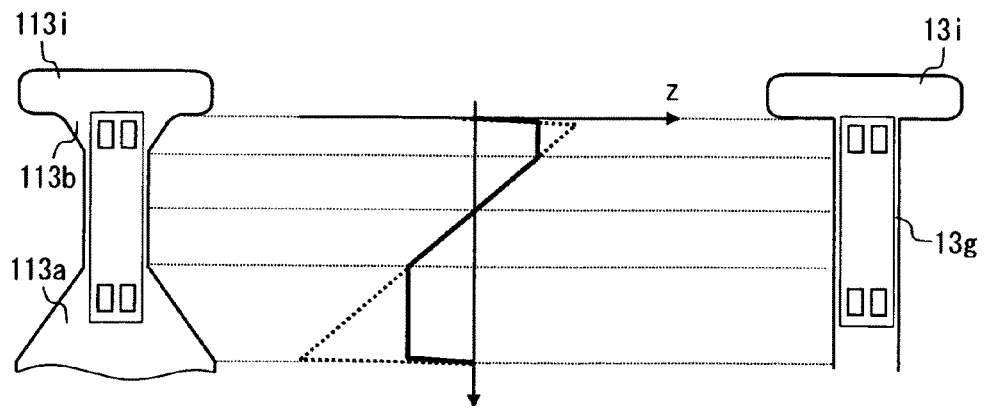
FIG. 21 is a combined drawing of a plan view of deformable members and a graph showing a strain amount according to the seventh embodiment of the present invention.

Next, a force sensing device according to a seventh embodiment of the present invention is explained by referring to FIG. 20 and FIG. 21. FIG. 20 is a drawing corresponding to FIG. 14B. FIG. 20 is a plan view of a force sensing device 100 according to the seventh embodiment of the present invention.

In the sixth embodiment, two plate members for the deformable member 13 have constant Y-axis width along the X-axis, respectively. As shown in FIG. 20, in the seventh embodiment, however, two plate members for the deformable member 13 have widened portions, such as a fan-shaped portion 113a close to the connecting member and a fan-shaped portion 113b close to the fixing portion. The remaining configuration of the seventh embodiment is the same as or similar to the configuration described in the preceding embodiments. Hereinafter, different portions from the first embodiment are mainly explained. The fan-shaped portion 113a close to the connecting member may be referred to as a fan-shaped connection portion 113a. The fan-shaped portion 113b close to the fixing portion may be referred to as a fan-shaped end 113b.

FIG. 21 is a combined drawing of a plan view of deformable members and a graph showing a strain amount when the applied force in the plus direction in the Z-axis is applied to the manipulatable member 12. The force in the plus direction in the Z-axis may be also referred to as the force Fz(+). The force in the minus direction in the Z-axis may be also referred to as the force Fz(−). In FIG. 21, the deformable member of this seventh embodiment is illustrated on the left side of the drawing. The deformable member in the above mentioned embodiments is illustrated on the right side of the drawing. A graph illustrated on the center of FIG. 21 shows strain amount of the deformable member when an applied force Fz(+) is applied. In the graph, the solid line shows strain amount of the deformable member having a shape illustrated on the left side. The broken line shows strain amount of the deformable member having a shape illustrated on the right side. The right side in FIG. 21 shows an enlarged view of a third portion 13g of the deformable member which does not have any fan-shaped portion. In the center part of FIG. 21, the broken line shows distribution of amount of elastic deformation of the third portion 13g when the applied force Fz(+) is applied to the third portion 13g.

As shown in FIG. 21 by the broken line, a strain amount on the third portion 13g takes maximum value in the plus direction in the Z-axis at a fixing portion 13i where the deformable member 13 is fixed on the housing 15. The strain amount decreases in a linear fashion as being spaced apart from the fixing portion 13i and approaching to a connection portion to the connecting member 14. The strain amount takes maximum value in the minus direction in the Z-axis at the connection portion to the connecting member 14. The same or similar tendency of strain amount appears also on a first portion 13e, a second portion 13f, and a fourth portion 13h as well as the third portion 13g.

Here, in order to pull out the maximum performance from the strain detecting elements 171g-174g, it is desirable to arrange the strain detecting elements 171g-174g in the location where the amount of strain on the third portion 13g become the maximum.

However, a certain amount of arrangement area is needed for arranging the strain detecting elements 171g-174g. For this reason, it is difficult or impossible to arrange the strain detecting elements 173g and 174g to a fixing portion 13i of the deformable member 13 where the maximum amount of strain within the third portion 13g can be observed. Similarly, it is also difficult or impossible to arrange the strain detecting elements 171g and 172g to the connection portion to the connecting member 14 where the maximum amount of strains within the third portion 13g can be observed. For this reason, the strain detecting elements 173g and 174g have to be unwillingly arranged on a portion close to the fixing portion 13i of the deformable member where the amount of strain does not take the maximum value within the third portion 13g. Similarly, the strain detecting elements 171g and 172g have to be unwillingly arranged on a portion close to the connection portion to the connecting member 14 where the amount of strain does not take the maximum value within the third portion 13g. Therefore, the strain detecting elements 171g-174g can not perform the maximum performance.

In this case, the amount of strain on the third portion 13g changes linearly. From this characteristics, the outputs from the strain detecting elements 171g-174g with respect to the amount of strain on the third portion 13g may adversely take different values in response to only slight shifting of the arrangement location of the strain detecting elements 171g and 172g on the third portion 13g. Similarly, From this characteristics, the outputs from the strain detecting elements 171g-174g with respect to the amount of strain on the third portion 13g may adversely take different values in response to only slight shifting of the arrangement location of the strain detecting elements 173g and 174g on the third portion 13g. As a result, the force sensing device may become a device with low robustness against the arrangement location of the strain detecting elements 17 on the surface of the deformable member 13.

In another aspect, there is a durability condition (upper limit) about the amount of strain on the deformable member 13. The durability condition is set so that the deformable member 13 never get a fatigue fracture etc. even the deformable member 13 is repeatedly deformed elastically. One possibility to satisfy the durability condition is that the deformable member 13 is constructed so that the amount of strain of the deformable member 13 on the arrangement location of the strain detecting elements 17 becomes a certain amount of strain which satisfies the durability condition. However, in this case, since the amount of strain on the fixing portion 13i and the amount of strain on the connection portion to the connecting member 14 may become the amount of strain which exceeds the durability condition, the force sensing device may be a device that lacks durability.

To overcome the above problem, in this embodiment, two plates for the deformable member 113 have fan-shaped portions 113a and fan-shaped portions 113b. In other words, the deformable member 113 provides four arm portions 113e-113h. Each of the arm portions 113e-113h has the fan-shaped portion 113a and the fan-shaped portion 113b on both longitudinal ends, respectively. In detail, as shown in FIG. 20, the fan-shaped portion 113a is provided with a pair of oblique sides which are spaced apart wider from each other as approaching to a substantial center section in the X-axis direction of the deformable member 13 which is the connection portion to the connecting member 14. The fan-shaped portion 113b is provided with a pair of oblique sides which are spaced apart wider from each other as approaching to the fixing portion 113i of the deformable member 113 which is a distal end thereof.

The left side of FIG. 21 shows an enlarged plan view of the third portion 113g of the deformable member 113 having the fan-shaped portion 113a and the fan-shaped portion 113b. In the center part of FIG. 21, the solid line shows distribution of amount of elastic deformation of the third portion 113g when the applied force Fz(+) is applied to the third portion 113g.

As shown to FIG. 21 by the solid line, the amount of strain on the third portion 113g of the deformable member 113 is controlled in almost flat. The amount of strain on the third portion 113g takes the maximum value in the plus direction in the Z-axis and is maintained at almost constant over a predetermined range from the fixing portion 113i to a portion where the fan-shaped portion 113b is formed. The amount of strain on the third portion 113g decreases in a linear fashion as being spaced apart from the fixing portion 113i and approaching to the connection portion to the connecting member 14. The amount of strain on the third portion 113g takes the maximum value in the minus direction in the Z-axis and is maintained at almost constant over a predetermined range from a portion where the fan-shaped portion 113a is formed to the connection portion to the connecting member 14. The same or similar tendency of strain amount appears also on the first portion 113e, the second portion 113f, and the fourth portion 113h as well as the third portion 13g.

By forming the fan-shaped portion 113b on the deformable member 13, the amount of strain on the third portion 113g takes the maximum value in the plus direction in the Z-axis and is maintained at almost constant over a predetermined range from the fixing portion 113i to a portion where the fan-shaped portion 113b is formed. For this reason, even if the arrangement location of the strain detecting elements 171g and 172g on the third portion 13g shifts slightly within the above mentioned predetermined range, variation of the outputs from the strain detecting elements 171g and 172g with respect to the amount of strain on the third portion 13g is decreased.

Similarly, by forming the fan-shaped portion 113a on the deformable member 13, the amount of strain on the third portion 113g takes the maximum value in the minus direction in the Z-axis and is maintained at almost constant over a predetermined range from a portion where the fan-shaped portion 113a is formed to the connection portion to the connecting member 14. For this reason, even if the arrangement location of the strain detecting elements 173g and 174g on the third portion 13g shifts slightly within the above mentioned predetermined range, variation of the outputs from the strain detecting elements 173g and 174g with respect to the amount of strain on the third portion 13g is decreased.

Thus, the variation in the outputs of the strain detecting elements 171g-174g with respect to the amount of strain on the third portion 13g is decreased. As a result, the force sensing device 100 may become a device with improved robustness against the arrangement location of the strain detecting elements 17 on the surface of the deformable member 13.

In addition, it is possible to adjust the maximum amount of strain on the fixing portion 113i of the deformable member 113 by setting a spreading angle BETA of the oblique side of the fan-shaped portion 113b. The angle BETA is shown in FIG. 20. The angle BETA is defined between the oblique side the fan-shaped portion 113b and a centerline C3 of the third portion 113g of the deformable member 113. In addition, it is possible to adjust the maximum amount of strain on the fixing portion 113i of the deformable member 113 by setting a spreading angle ALPHA of the oblique side of the fan-shaped portion 113a: The angle ALPHA is shown in FIG. 20. The angle ALPHA is defined between the oblique side the fan-shaped portion 113a and the centerline C3 of the third portion 113g of the deformable member 113.

In this embodiment, in consideration of the size of the force sensing device 100, the pair of oblique sides of the fan-shaped portion 113a is formed so that each of the spreading angles ALPHA is in a range between 15 degrees and 45 degrees. Similarly, the pair of oblique sides of the fan-shaped portion 113b is formed so that each of the spreading angles BETA is in a range between 15 degrees and 45 degrees.

Thereby, the maximum amount of strain on the arrangement location of the strain detecting elements 171g-174g on the deformable member 13 can be adjusted in a range which satisfies the above-mentioned durability condition. As a result, it is possible to pull out the maximum performance of the strain detecting elements 171g-174g while securing a certain durability of the force sensing device 100.

In this embodiment, the spreading angles of the oblique sides of the fan-shaped portions 113a and 113b are set within the range between 15 degrees and 45 degrees to meet a requirement for the size of the force sensing device 100. However, the spreading angles may be varied according to several requirements and may be set outside the range. The spreading angles ALPHA and BETA may be changed suitably not only in the range between 15 degrees and 45 degrees. For example, the spreading angles ALPHA and BETA may have different appropriate angles or optimal angles in accordance with several requirement, such as a size of the force sensing device 100, i.e., length of the deformable member 113 in the X-axis, a fixing method of the connecting member 14 to the deformable member 113, and arrangement locations of the strain detecting elements 171g-174h. For example, the spreading angles ALPHA and BETA may be set to have greater angles as a length of the deformable member 113 in the X-axis direction becomes longer.

In addition, in this embodiment, although the deformable member 113 has both of the fan-shaped portion 113a and the fan-shaped portion 113b, it is not limited to the above. The deformable member 113 may be formed to have at least one of the fan-shaped portion 113a and the fan-shaped portion 113b. It is also possible to improve the robustness over the arrangement location of the strain detecting elements 17 on the surface of the deformable member 113 by this configuration.

8th Embodiment

Figure 22A:
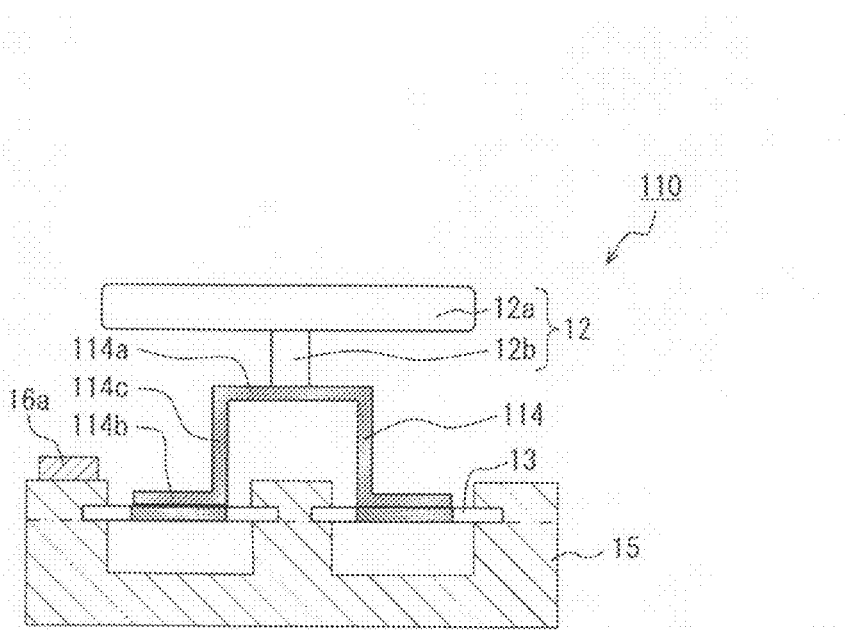
FIG. 22A is a sectional view of a force sensing device according to an 8th embodiment of the present invention, and shows a cross section XXII-A in FIG. 22B.
Figure 22B:
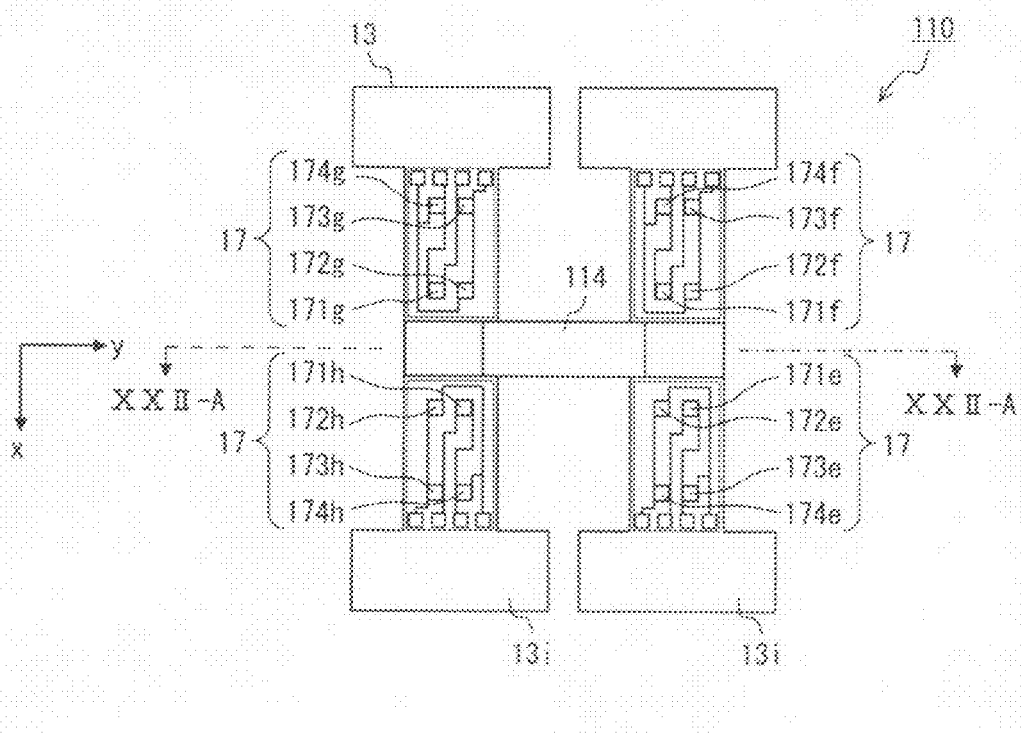
FIG. 22B is a plan view of the force sensing device according to the 8th embodiment of the present invention.

Next, an 8th embodiment of a force sensing device according to the present invention is explained by referring to FIG. 22A and FIG. 22B. FIGS. 22A and 22B are drawings corresponding to FIGS. 1A and 1B. FIG. 22A is a sectional view of the force sensing device 110 according to the 8th embodiment of the present invention, and shows a cross section XXII-A in FIG. 22B. FIG. 22B is a plan view of the force sensing device 110 according to the 8th embodiment of the present invention.

As shown in FIGS. 22A and 22B, in the 8th embodiment, a connecting member 114 is made of a single plate member which is bent by bending process. The remaining configuration of the 8th embodiment is the same as or similar to the configuration described in the preceding embodiments. Hereinafter, different portions from the first embodiment are mainly explained.

In detail, as shown in FIG. 22, the connecting member 114 has a manipulatable member joint portion 114a, a deformable member joint portion 114b, and a pair of joint portions 114c. The manipulatable member joint portion 114a is connected with the shaft 12b of the manipulatable member 12. The deformable member joint portion 114b is connected with the deformable member 13. The joint portions 114c connect between the manipulatable member joint portion 114a and the deformable member joint portion 114b. The connecting member 114 is manufactured by bending process of a plate material. Thereby, the connecting member 114 can be manufactured easily. Therefore, it is possible to manufacture the force sensing device 110 in low cost.

9th Embodiment

Figure 23A:
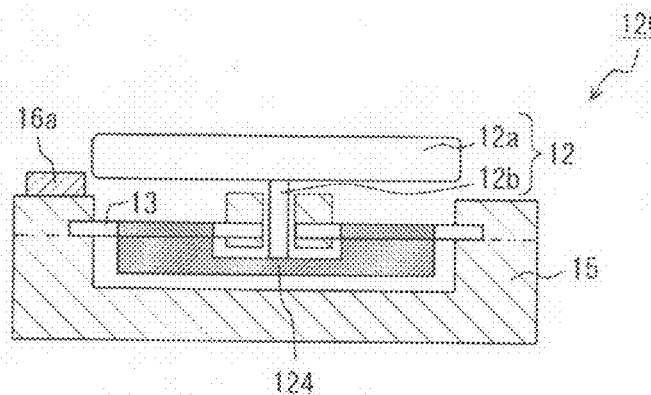
FIG. 23A is a sectional view of a force sensing device according to a 9th embodiment of the present invention, and shows a cross section XXIII-A in FIG. 23B.
Figure 23B:
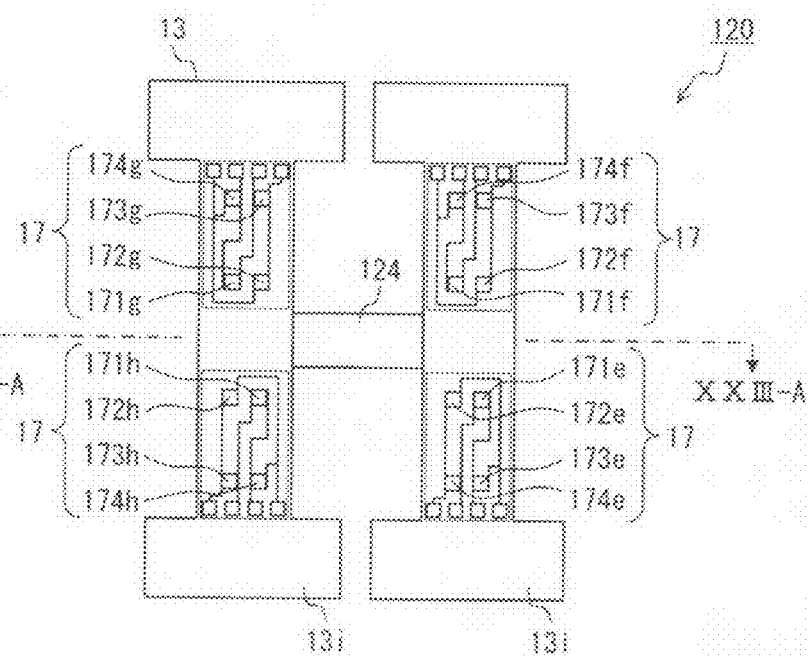
FIG. 23B is a plan view of the force sensing device according to the 9th embodiment of the present invention.

Next, a 9th embodiment of a force sensing device according to the present invention is explained by referring to FIG. 23A and FIG. 23B. FIGS. 23A and 23B are drawings corresponding to FIGS. 1A and 1B. FIG. 23A is a sectional view of the force sensing device 120 according to the 9th embodiment of the present invention, and shows a cross section XXIII-A in FIG. 23B. FIG. 23B is a plan view of the force sensing device 120 according to the 9th embodiment of the present invention.

As shown in FIGS. 23A and 23B, in the 9th embodiment, a connecting member 124 is firmly connected to a backside surface of the deformable member 13, and connects between the backside surface and the shaft 12b of the manipulatable member 12. The remaining configuration of the 9th embodiment is the same as or similar to the configuration described in the preceding embodiments. Hereinafter, different portions from the first embodiment are mainly explained. The connecting member 124 is connected to the deformable member 13 at a surface which is an opposite side to an surface where the strain detecting elements are disposed. Therefore, an element disposed area and a connected area where the connecting member 124 is connected to are arranged on both sides of the deformable member 13 in an overlapping manner. It is not necessary to form the element disposed area and the connected area in one surface of the deformable member 13. As a result, the deformable member 13 can be made small. Furthermore, the force sensing device 120 can be made small. The back surface of the deformable member 13 corresponds to an opposite side surface to the element disposed surface.

10th Embodiment

Figure 24:
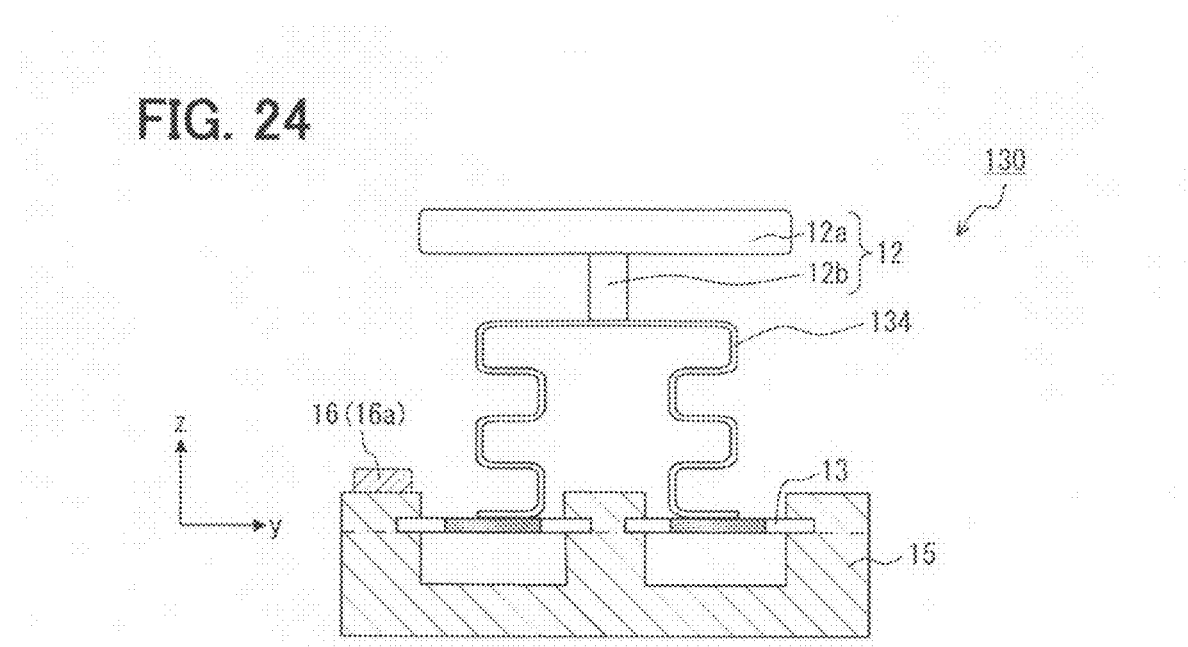
FIG. 24 is a sectional view of a force sensing device according to a 10th embodiment of the present invention.
Figure 25A:
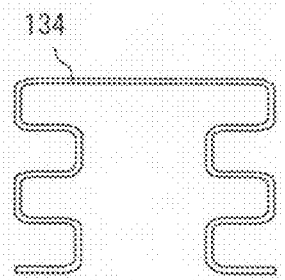
FIG. 25A is a plan view of a connecting member in the force sensing device according to the 10th embodiment.
Figure 25B:
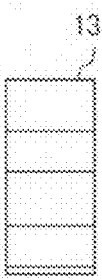
FIG. 25B is a side view of a connecting member in the force sensing device according to the 10th embodiment.

Next, a force sensing device according to a 10th embodiment of the present invention is explained by referring to FIG. 24, FIG. 25A, and FIG. 25B. FIG. 24 is a drawing corresponding to FIG. 1A. FIG. 24 is a sectional view of the force sensing device 130 according to the 10th embodiment of the present invention. FIG. 25A is a plan view of a connecting member 134 in the force sensing device 130 according to the 10th embodiment. FIG. 25B is a side view of a connecting member 134 in the force sensing device 130 according to the 10th embodiment.

As shown in FIGS. 24 through 25B, in the 10th embodiment, the connecting member 134 is made of a single plate spring member which has a plurality of bents formed by bending process. Each bents is formed by folding back a plate in 180 degrees by folding the plate in 90-degrees twice. In other words, the connecting member 134 is made of a plate having corrugated arms which connects the shaft 12b and the deformable member 13. The remaining configuration of the 8th embodiment is the same as or similar to the configuration described in the preceding embodiments. Hereinafter, different portions from the first embodiment are mainly explained. A shape of the plate spring, such as number of bends and width of each part, are adjustable in order to adjust an amount of displacement of the manipulatable member responsive to the applied force applied on the manipulatable member. For example, by adjusting the shape of the plate spring, such as number of bends and width of each part, substantially the same amount of displacement of the manipulatable member can be obtained in a plurality of directions of the applied forces. Preferably, the shape of the plate spring is adjusted to obtain the same amount of displacement of the manipulatable member regardless of the directions of the applied forces which are at least parallel to the element disposed surface of the deformable member. As a result, it is possible to realize fine operation feeling with little sense of incongruity.

The connecting member 134 performs the basic functions, such as connecting the deformable member 13 and the shaft 12b of the manipulatable member 12, and transmitting the applied force applied on the manipulatable member 12 to the deformable member 13. Furthermore, in addition, the plate spring is elastically deformed according to the applied force applied on the manipulatable member 12. For this reason, the connecting member 134 performs similar functions and obtains similar advantages to the force sensing device 70 (see FIG. 13) in the fifth embodiment. That is, since the manipulatable member 12 can be displaced largely by deforming the connecting member 134 in response to the applied force, it is possible to obtain an advantage that the operator can recognize that the applied force is applied by oneself.

In addition, the plate spring that is the connecting member 134 is manufactured by processing a plate material of spring, for example by press working. During this press working, it is possible to adjust a shape of the plate spring, such as width in the X-axis direction of the plate spring, number of bends in the Y-axis direction of the plate spring, height of folding back shape in the Z-axis direction of plate spring. By such an adjustment of the shape of the plate spring, regardless of the directions of the applied force, such as the applied force in the X-axis direction and the applied force in the Y-axis direction, substantially the same amount of displacement of the manipulatable member 12 with respect to the applied force applied on the manipulatable member 12 is obtained in all directions. As a result, it is possible to realize fine operation feeling with little sense of incongruity.

Figure 26A:
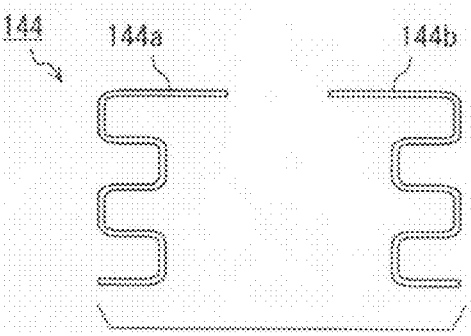
FIG. 26A is a plan view of a connecting member in a force sensing device according to a modification of the 10th embodiment.
Figure 26B:
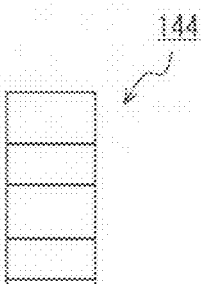
FIG. 26B is a side view of a connecting member in the force sensing device according to the modification of the 10th embodiment.

Although the connecting member 134 is formed with a single plate spring member in this embodiment, it is not limited to the above. For example, the force sensing device may have a connecting member 144 which is formed by a plurality of members, such as two plate spring members 144a and 144b. FIG. 26A and FIG. 26B show the connecting member 144 which is formed by combining two plate springs 144a and 144b. FIG. 26A is a plan view of the connecting member 144 in the force sensing device according to the modification of the 10th embodiment. FIG. 26A is an exploded view of the connecting member 144. FIG. 26B is a side view of the connecting member 144 in the force sensing device according to the modification of the 10th embodiment. In a case of the 10th embodiment, since it is necessary to form a single plate spring into a complicated shape of the connecting member 134, it is difficult to process the plate spring by one press working. For this reason, it may be necessary to perform multiple times of press working.

However, in the modified embodiment illustrated in FIGS. 26A and 26B, the single plate spring providing the above mentioned connecting member 134 is divided into two pieces at the X-Y plane passing through the center of an upper part thereof. The connecting member 144 is constructed by combining such two plate springs 144a and 144b. Thereby, each shape of the plate springs 144a and 144b can be simplified. As a result, it is possible to process each component easily in small number of times of press working, for example, 1 time. Therefore, according to this modification, it is possible to provide the force sensing device 130 in low cost. The plate springs 144a and 144b may be assembled and fixed into one unit as the connecting member 144, then, this assembled connecting member 144 may be connected to the deformable member 13 and the shaft 12b of the manipulatable member 12. The plate springs 144a and 144b may be assembled into one unit as the connecting member 144 by fixing them on the deformable member 13, respectively, then, this assembled connecting member 144 may be connected to the shaft 12b of the manipulatable member 12. The plate springs 144a and 144b may be assembled into one unit as the connecting member 144 by fixing them on the shaft 12b of the manipulatable member 12, respectively, then, this assembled connecting member 144 may be connected to the deformable member 13 together with the manipulatable member 12. As mentioned above, various assembling methods may be used for the plate springs 144a and 144b. The strain detecting elements in the embodiments may be provided by strain gauges or a thick film resistor.

Other Embodiments

Although the connecting members 14-64 in the above-mentioned embodiments are firmly connected with both the element disposed surface of the deformable members 13-33 and the shaft 12b of the manipulatable member 12, the invention is not limited to the above structures. For example, the connecting members 14-64 may be firmly connected with both a surface opposite to the element disposed surface of the deformable members 13-33 and the shaft 12b of the manipulatable member 12. In addition, the deformable member may be formed in various shapes other than the illustrated shapes, such as the I-shape, the H-shape, and the swastika shape. In addition, the components and parts in one of the above-mentioned embodiments may be combined with the other embodiment.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A force sensing device for sensing a force applied on a manipulatable member having a shaft, the device comprising:
    a deformable member capable of deforming elastically and formed in a plate shape;
    a connecting member which connects the deformable member and the shaft of the manipulatable member;
    at least four strain detecting elements which detects the deformation of the deformable member and outputs detection signals indicative of the applied force applied to the manipulatable member, all the strain detecting elements being arranged on one plane, wherein
    the connecting member is formed with a single plate member formed in a bent shape by a bending process.

2. A force sensing device for sensing a force applied on a manipulatable member having a shaft, the device comprising:
    a deformable member capable of deforming elastically and formed in a plate shape;
    a connecting member which connects the deformable member and the shaft of the manipulatable member; and
    at least four strain detecting elements which detects the deformation of the deformable member and outputs detection signals indicative of the applied force applied to the manipulatable member, all the strain detecting elements being arranged on one plane, wherein
    the connecting member is made of a plate spring with a plurality of bends, and transmits the applied force to the deformable member while elastically deforming according to the applied force acting on the manipulatable member.

3. The force sensing device in claim 2, wherein
    the connecting member is formed with a single plate spring.

4. The force sensing device in claim 2, wherein
    the connecting member is formed by combining two plate springs.

* * * * *